(12) United States Patent
Yu et al.

(10) Patent No.: US 10,366,166 B2
(45) Date of Patent: Jul. 30, 2019

(54) DEEP COMPOSITIONAL FRAMEWORKS FOR HUMAN-LIKE LANGUAGE ACQUISITION IN VIRTUAL ENVIRONMENTS

(71) Applicant: Baidu USA, LLC, Sunnyvale, CA (US)

(72) Inventors: Haonan Yu, Sunnyvale, CA (US); Haichao Zhang, Sunnyvale, CA (US); Wei Xu, Saratoga, CA (US)

(73) Assignee: Baidu USA LLC, Sunnyvale, CA (US)

( * ) Notice: Subject to any disclaimer, the term of this patent is extended or adjusted under 35 U.S.C. 154(b) by 0 days.

(21) Appl. No.: 15/698,614

(22) Filed: Sep. 7, 2017

(65) Prior Publication Data
US 2019/0073353 A1 Mar. 7, 2019

(51) Int. Cl.
*G10L 21/00* (2013.01)
*G06F 17/27* (2006.01)
(Continued)

(52) U.S. Cl.
CPC ........ *G06F 17/2785* (2013.01); *G06F 17/271* (2013.01); *G06K 9/46* (2013.01);
(Continued)

(58) Field of Classification Search
CPC ............. G06F 17/2785; G06F 17/3002; G06F 17/30554; G06F 17/30654; G06F 17/30769; G06F 17/30991; G06K 9/00718; G06K 9/4671; G06K 2009/4666; G06K 9/46; G06K 9/6256; G06K 9/6267; G06K 9/66; G06K 9/00402; G06K 9/00409; G06K 9/4628; G06K 9/6217; G06K 9/627;
(Continued)

(56) References Cited

U.S. PATENT DOCUMENTS 9,554,081 B2 * 1/2017 Hanckmann ....... G06K 9/00718
9,965,705 B2 * 5/2018 Chen .................... G06N 3/0454
(Continued)

OTHER PUBLICATIONS

Ren et al., ("Exploring Models and Data for Image Question Answering", May 29, 2015, ICML 2015, pp. 1-12), 2015. (Year: 2015).*
(Continued)

*Primary Examiner* — Vijay B Chawan
(74) *Attorney, Agent, or Firm* — North Weber & Baugh LLP

(57) ABSTRACT

Described herein are systems and methods for human-like language acquisition in a compositional framework to implement object recognition or navigation tasks. Embodiments include a method for a model to learn the input language in a grounded and compositional manner, such that after training the model is able to correctly execute zero-shot commands, which have either combination of words in the command never appeared before, and/or new object concepts learned from another task but never learned from navigation settings. In embodiments, a framework is trained end-to-end to learn simultaneously the visual representations of the environment, the syntax and semantics of the language, and outputs actions via an action module. In embodiments, the zero-shot learning capability of a framework results from its compositionality and modularity with parameter tying.

19 Claims, 17 Drawing Sheets

(51) Int. Cl.
| | |
|---|---|
| *G10L 25/30* | (2013.01) |
| *G06K 9/66* | (2006.01) |
| *G06N 3/08* | (2006.01) |
| *G06K 9/62* | (2006.01) |
| *G06N 3/04* | (2006.01) |
| *G06K 9/46* | (2006.01) |
| *G10L 21/055* | (2013.01) |

(52) U.S. Cl.
CPC ............. *G06K 9/6267* (2013.01); *G06K 9/66* (2013.01); *G06N 3/04* (2013.01); *G06N 3/0445* (2013.01); *G06N 3/08* (2013.01); *G10L 21/055* (2013.01); *G10L 25/30* (2013.01)

(58) Field of Classification Search
CPC ...... G06N 3/02; G06N 3/0445; G06N 3/0454; G06N 5/04; G06N 3/08; G06N 7/005; H04N 5/91; G10L 21/055
USPC .... 704/2, 3, 4, 7, 270, 275, 270.1; 709/217; 715/740
See application file for complete search history.

(56) References Cited

U.S. PATENT DOCUMENTS

| | | | | |
|---|---|---|---|---|
| 2007/0130112 | A1* | 6/2007 | Lin | G06F 17/3002 |
| 2008/0306988 | A1* | 12/2008 | Aggarwal | G06F 17/30554 |
| 2014/0105573 | A1* | 4/2014 | Hanckmann | G06K 9/00718 |
| | | | | 386/241 |
| 2014/0201126 | A1* | 7/2014 | Zadeh | G06K 9/627 |
| | | | | 706/52 |
| 2014/0363082 | A1* | 12/2014 | Dixon | G06K 9/00402 |
| | | | | 382/187 |
| 2017/0124432 | A1* | 5/2017 | Chen | G06N 3/0454 |
| 2017/0177972 | A1* | 6/2017 | Cricri | G06K 9/4671 |
| 2017/0357720 | A1* | 12/2017 | Torabi | G06F 17/30769 |

OTHER PUBLICATIONS

Long et al., "Fully convolutional networks for segmentation," arXiv preprint arXiv: 1411.4038v2, [sc.CV] Mar. 8, 2015, pp. 1-10), 2015. (Year: 2015).*
Lin et al., ("Microsoft COCO: Common objects in context", In Computer Vision—ECCV 2014, pp. 740-755), 2014. (Year: 2014).*
Jin et al., "Aligning where to see and what to tell: image caption with region based attention and scene factorization," arXiv preprint arXiv: 1506.06272, 2015 (20pgs), 2015. (Year: 2015).*
Karpathy et al., ("Deep visual-semantic alignments for generating image descriptions," arXiv preprint arXiv: 1412.2306, 2014 17pgs) , 2015. (Year: 2014).*
Sun et al., ("Automatic Concept Discovery from Parallel Text and Visual Corpora," arXiv preprint arXiv:1509.07225, abs/109/07225, 2015, pp. 1-9), 2015. (Year: 2015).*
Mnih et al.,"Human-level control through deep reinforcement learning," Nature, 518(7540): 529-533, 2015 (13 pgs).
Neelakantan et al.,"Neural programmer: Inducing latent programs with gradient descent," in International Conference on Learning Representations, 2016 (18 pgs).
Ren et al.,"Exploring models and data for image question answering," in Advances in Neural Information Processing Systems, pp. 2953-2961, 2015 (12 pgs).
Rohrbach et al.,"Grounding of textual phrases in images by reconstruction," in European Conference on Computer Vision, pp. 817-834, 2016(18 pgs).
Schaul et al.,"Prioritized experience replay," in ICLR, 2016 (21 pgs).
Schuster et al.,"Bidirectional recurrent neural networks," IEEE Transactions on Signal Processing, 45(11):2673-2681, 1997 (9 pgs).
Sukhbaatar et al.,"Mazebase: A sandbox for learning from games," arXiv preprint arXiv:1511.07401, 2016 (11 pgs).
25 Sutton et al.,"Reinforcement learning: An introduction," vol. 1. MIT press Cambridge, 1998 (445 pgs).
Tamar et al.,"Value iteration networks," in Advances in Neural Information Processing Systems, pp. 2146-2154, 2016 (14 pgs).
Teney et al.,"Zero-shot visual question answering," arXiv preprint arXiv:1611.05546, 2016 (18 pgs).
Yang et al.,"Stacked attention networks for image question answering," In Proceedings of the IEEE Conference on Computer Vision and Pattern Recognition, pp. 21-29, 2016.
Yu et al.,"Grounded language learning from video described with sentences," In Proceedings of the Annual Meeting of the Association for Computational Linguistics, pp. 53-63, 2013 (11 pgs).
Printed from internert: <URL: https://www.extremetech.com/extreme/247089-baidu-ai-achieves-zero-shot-learning-ability-using-natural-language/> [online], [retrieved May 22, 2017] (4 pgs).
Andreas et al.,"Neural module networks," In Proceedings of the IEEE Conference on Computer Vision and Pattern Recognition, 2016 (10 pgs).
Andreas et al.,"Learning to compose neural networks for question answering," in ACL, pp. 1545-1554, 2016b (10 pgs).
Barrett et al., "Robot language learning, generation, and comprehension," arXiv preprint arXiv:1508.06161, 2015 (10 pgs).
Beattie et al.,"Deepmind lab," CoRR, abs/1612.03801, 2016 (11 pgs).
Bengio et al.,"Curriculum learning," In Proceedings of the 26th annual international conference on machine learning, pp. 41-48,2009 (8 pgs).
Chen et al., "Learning to interpret natural language navigation instructions from observations," In AAAI, vol. 2, pp. 1-2, 2011 (7 pgs).
Cho et al.,"Learning phrase representations using RNN encoder-decoder for statistical machine translation," In Conference on Empirical Methods in Natural Language Processing, 2014 (11 pgs).
Duchi et al.,"Adaptive subgradient methods for online learning and stochastic optimization," Journal of Machine Learning Research, 12(Jul):2121-2159, 2011 (39 pgs).
Gao et al.,"Are you talking to a machine? dataset and methods for multilingual image question," In NIPS, pp. 2296-2304, 2015 (10 pgs).
Gao et al.,"Physical causality of action verbs in grounded language understanding," In Proceedings of the 54th Annual Meeting of the Association for Computational Linguistics, vol. 1, pp. 1814-1824, 2016 (11 pgs).
Johnson et al.,"The malmo platform for artificial intelligence experimentation," In Proc. 25th International Joint Conference on Artificial Intelligence, 2016 (2 pgs).
Kempka et al.,"ViZDoom: A Doom-based AI research platform for visual reinforcement learning," In IEEE Conference on Computational Intelligence and Games, pp. 341-348, 2016.
Kiela et al.,"Virtual embodiment: A scalable long-term strategy for artificial intelligence research," In NIPS Workshop, 2016 (5 pgs).
Lake et al.,"Building machines that learn and think like people," Behavioral and Brain Sciences, pp. 1-101, 11 2016 (58 pgs).
Lu et al.,"Hierarchical question-image co-attention for visual question answering," In Advances in Neural Information Processing Systems, pp. 289-297, 2016 (9 pgs).
Mao et al.,"Learning like a child: Fast novel visual concept learning from sentence descriptions of images," In Proceedings of the IEEE International Conference on Computer Vision, pp. 2533-2541, 2015 (10 pgs).
Mikolov et al.,"A roadmap towards machine intelligence," arXiv preprint arXiv:1511.08130, 2015 (39 pgs).

* cited by examiner

1500

*Could you please go to the dog?*

(a)

*Please reach south of the cucumber.*

(b)

DEEP COMPOSITIONAL FRAMEWORKS FOR HUMAN-LIKE LANGUAGE ACQUISITION IN VIRTUAL ENVIRONMENTS

BACKGROUND

A. Technical Field

The present disclosure relates generally to systems and methods for computer learning that can provide improved computer performance, features, and uses.

B. Background

The development of a sophisticated language system is a very crucial part of achieving human-level intelligence for a machine. Language semantics, when grounded in perception experience, can encode knowledge about perceiving the world. This knowledge is transferred from task to task, which empowers the machine with generalization ability.

Human generalize surprisingly well when learning new concepts and skills through natural language instructions. In other words, human have the "zero-shot" learning ability. Zero-shot learning is the ability to learn something in the first instance or first exposure. Current machine learning techniques do not have a reasonably fast learning rate for zero-shot learning ability.

Accordingly, what is needed are systems and methods for human-like language acquisition to implement object recognition, queries, or navigation tasks, which improves the functioning of computing devices for machine learning. Such systems and methods may be used to provide or improve computing device services, such as, by way of training, having zero-shot learning ability.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may not be to scale.

DETAILED DESCRIPTION OF EMBODIMENTS

Figure 1:
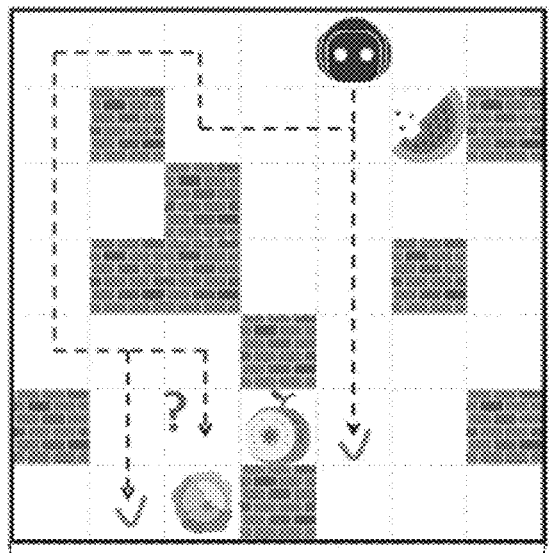
FIG. 1 depicts an example environment (which may be referred to as the XWORLD environment) and example zero-shot navigation tasks according to embodiments of the present disclosure.
Figure 1:
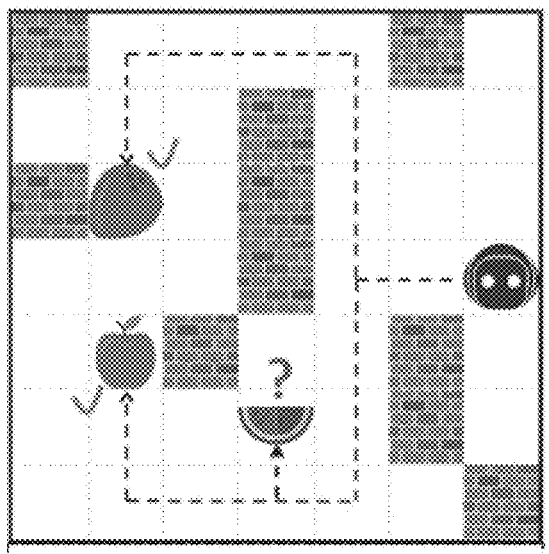

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each document mentioned in this patent disclosure is incorporate by reference herein in its entirety.

Furthermore, one skilled in the art shall recognize that: (1) certain steps may optionally be performed; (2) certain steps may not be limited to the specific order set forth herein; (3) certain steps may be performed in different orders; and (4) certain steps may be done concurrently.

A. Introduction

As previously mentioned, the development of a sophisticated language system is a very crucial part of achieving human-level intelligence for a machine. Language semantics, when grounded in perception experience, can encode knowledge about perceiving the world. This knowledge is transferred from task to task, which empowers the machine with generalization ability. It has been argued that a machine has to go through physical experience in order to learn human-level semantics, i.e., a process of human-like language acquisition. However, current machine learning techniques do not have a reasonably fast learning rate to make this happen. Thus, in embodiments, this problem is modeled in a virtual environment as the first step towards training a physical intelligent machine.

Human generalize surprisingly well when learning new concepts and skills through natural language instructions. Humans are able to apply an existing skill to newly acquired concepts with little difficulty. For example, a person who has learned how to execute the command "cut X with knife" when "X" equals to apple, will perform correctly when "X" is something else he knows (e.g., a pear), even though he may have never been asked to cut anything other than an apple before. In other words, human have the zero-shot learning ability.

This patent document describes a framework that demonstrates the zero-shot learning ability of an agent in a specific task, namely, learning to navigate in a 2D maze-like environment called XWORLD (see, e.g., FIG. 1). An interest of the current patent document is solving a similar task that is faced by a baby who is learning to walk and navigate, at the stage of learning his parents' language. The parents might give some simple navigation command comprising only two or three words in the beginning, and gradually increase the complexity of the command as time goes by. Meanwhile, the parents might teach the baby the language in some other tasks such as object recognition. After the baby understands the language and masters navigation skill, he could immediately navigate to a new concept that is learned from object recognition but never appeared in a navigation command before.

In embodiments, a baby agent is trained across many learning sessions in XWORLD. In each session, the agent perceives the environment through a sequence of raw-pixel images, a natural language command issued by a teacher, and a set of rewards. The agent also occasionally receives the teacher's questions on object recognition whenever certain conditions are triggered. By exploring the environment, the agent learns simultaneously the visual representations of the environment, the syntax and semantics of the language, and how to navigate itself in the environment. In embodiments, the whole framework employed by the agent is trained end to end from scratch by gradient descent. The agent is tested under three different command conditions, two of which require that the agent generalizes to interpret unseen commands and words, and that the framework architecture is modular so that other modules such as perception and action will still work properly under such circumstance. The presented experiments show that the agent performs equally well (~90% average success rate) in all conditions. Moreover, several baselines that simply learn a joint embedding for image and language yield poor results.

In summary, some of the main contributions of embodiments discussed herein are two-fold:

A new deep reinforcement learning (DRL) task that integrates both vision and language. The language is not pre-parsed or pre-linked to the environment. Instead, the agent has to learn everything from scratch and ground the language in vision. This task models a similar scenario faced by a learning child.

The zero-shot learning ability by leveraging the compositionality of both the language and the network architecture. It is believed that this ability is a crucial component of human-level intelligence.

B. Related Work

The disclosed work is inspired by the research of multiple disciplines. The XWORLD is similar to the MazeBase environment (which is described in Sukhbaatar et al., Mazebase: A sandbox for learning from games, arXiv preprint arXiv:1511.07401, 2016) in that both are 2D rectangular grid world. However, one important difference is that the quasi-natural language used in MazeBase is already parsed and linked to the environment. Sukhbaatar put more focus on reasoning and planning but not language acquisition. On the contrary, embodiments of the present disclosure emphasize on how to ground the language in vision and generalize the ability of interpreting the language. There are several challenging 3D environments for Reinforcement Learning (RL), such as ViZDoom and DeepMind Lab. While the visual perception problems posed by them may be much more difficult than the present disclosure, these environments do not require language understanding. In embodiments, the agent herein learns to interpret different goals from different natural language commands.

In embodiments, setting of language learning shares some similar ideas of the AI roadmap proposed by Mikolov et al., A roadmap towards machine intelligence, arXiv preprint arXiv:1511.08130, 2015. Like theirs, embodiments in the present disclosure also have a teacher in the environment that assigns tasks and rewards to the agent. The teacher may also provide additional questions and answers to the agent in an object recognition task. Unlike their proposal of entirely using linguistic channels, aspects of the present tasks involve multiple modalities and are more similar to human experience.

The importance of compositionality and modularity of a learning framework has been discussed at length in cognitive science by Lake et al., Building machines that learn and think like people, Behavioral and Brain Sciences, pages 1-101, 11, 2016. The compositionality of embodiments of the frameworks here are inspired by the ideas in Neural Programmer and Neural Module Networks. Neural Programmer is trained with backpropagation by employing soft operations on databases. Neural Module Networks assemble several primitive modules according to questions in Visual Question Answering (VQA). It depends on an external parser to convert each sentence to one or several candidate parse trees and thus cannot be trained end to end. In embodiments, their primitive modules are adapted to framework embodiments with differentiable computation units to enable gradient calculation.

The recognition task is essentially image VQA. The navigation task can also be viewed as a VQA problem if the actions are treated as answer labels. Moreover, it is a zero-shot VQA problem (i.e., test questions containing unseen concepts) which has not been well addressed yet.

The present language acquisition problem is somewhat related to some recent work on grounding language in images and videos. The navigation task is also relevant to robotics navigation under natural language command. However, these approaches either assume annotated navigation paths in the training data or do not ground language in vision. As XWORLD is a virtual environment, embodiments of the present disclosure currently do not address mechanics problems encountered by a physical robot, but focuses on its mental model building.

C. Embodiments of XWORLD Environment

In this section, the XWORLD environment is briefly described, although more details are in Section F.4. In embodiments, XWORLD is a 2D grid world. FIG. 1 depicts an illustration of the XWORLD environment and the zero-shot navigation tasks. FIG. 1(a) depicts a test command that contains an unseen word combination. FIG. 1(b) depicts a Test command that contains completely new object concepts that are learned from the recognition task in some previous sessions as shown in FIG. 1(a). An agent interacts with the environment over a number of time steps T, with four actions: up, down, left, and right. It does so for many sessions. At the beginning of each session, a teacher starts a timer and issues a natural language command asking the agent to reach a location referred to by an object or objects in the environment. There might be other objects as distractors. Thus, the agent needs to differentiate and navigate to the correct location. It perceives the entire environment through Red-Green-Blue (RGB) pixels with an egocentric view (FIG. 2(c)), in which the agent is always in the center (blank pixels may used to fill the space as shown in FIG. 2(c)). If the agent correctly executes the command before running out of time, it gets a positive reward. Whenever it hits a wall or steps on an object that is not the target, it gets a negative reward. The agent also receives a small negative reward at every step as a punishment for taking too much time. After each session, the environment is reset randomly.

Some example commands are (the parentheses contain environment configurations that are withheld from the agent, same below):

Please navigate to the apple. (There is an apple, a banana, an orange, and a grape.)

Can you move to the grid between the apple and the banana? (There is an apple and a banana. The apple and the banana are separated by one empty grid.)

Could you please go to the red apple? (There is a green apple, a red apple, and a red cherry.)

The difficulty of this navigation task is that, at the very beginning, the agent knows nothing about the language: every word appears equally meaningless. After trial and error, it has to figure out the language syntax and semantics in order to correctly execute the command.

While the agent is exploring the environment, the teacher also asks object-related questions whenever certain conditions are triggered (conditions are listed in Section F.4). In embodiments, the answers are always single words and provided by the teacher for supervision. Some example QA pairs are (once again, the parentheticals are withheld from the agent):

Q: What is the object in the north? A: Banana. (The agent is by the south of a banana, by the north of an apple, and by the west of a cucumber.)

Q: Where is the banana? A: North. (The agent is by the south of a banana and the east of an apple.)

Q: What is the color of the object in the west of the apple? A: Yellow. (An apple has a banana on its west and a cucumber on its east.)

The agent is expected to transfer the knowledge exclusively learned from this recognition task to the navigation task to execute zero-shot commands.

D. Embodiments of Compositional Framework for Zero-shot Navigation

The zero-shot navigation problem may be formulated as training a policy with a grounding model:

$$\pi(y|\varepsilon,a), \text{with } a=\text{Grounding}(\varepsilon,C) \qquad (1)$$

that works correctly for a new test command C' which never appears in the training set. In the above formulation, y is the agent's navigation action, $\varepsilon$ is the perceived environment, a is the navigation goal attention computed by grounding the teacher's command C in the environment $\varepsilon$. Note that the policy $\pi(y|\varepsilon, a)$ depends on a but not directly on C, thus one problem is essentially how to ground a new command to get the correct attention map.

Figure 2:
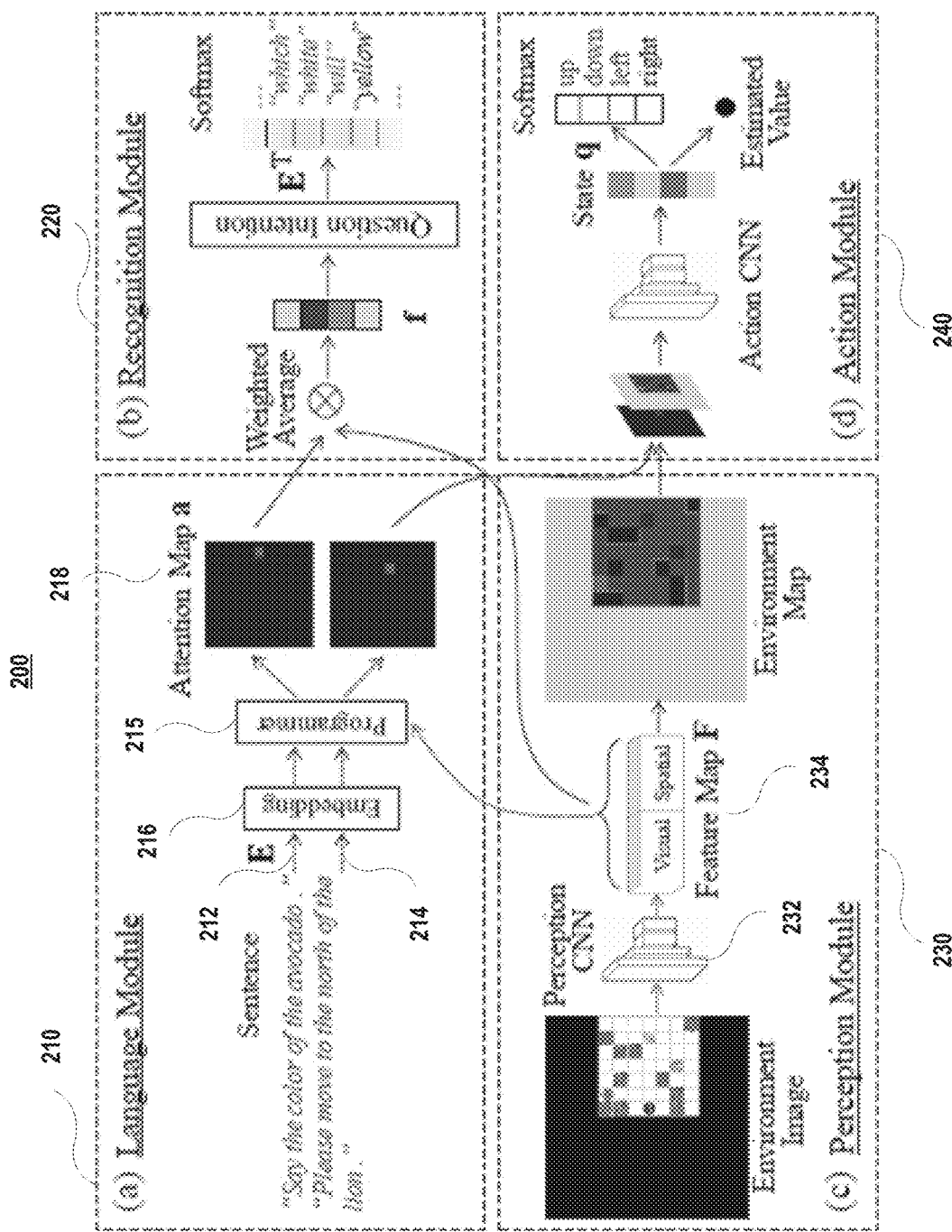
FIG. 2 depicts an overview of a deep compositional framework according to embodiments of the present disclosure.

FIG. 2 depicts an overview of a deep compositional framework according to embodiments of the present disclosure. In embodiments, the disclosed framework 200 for solving this problem contains four major modules: a language module 210, a recognition module 220, a perception module 230, and an action module 240. The perception module 230 received an input of environment image and transforms the environment image into a feature map 234 via a Convolutional Neural Network 232. The language module 210 receives a set of words (e.g., a phrase, a question, a sentence, etc.), either a navigation command or a question, and outputs an attention map 218, using a programmer 215 (see FIG. 3), based on word embedding 216 extracted from the sentence and additional information from the Feature map 234. The output from the framework 200 is either a navigation action or an answer to the question, depending upon the input. The lines 212 and 214 (and corresponding subsequent lines) indicate different routes or processes in response to question sentence input and navigation command input respectively.

Figure 3:
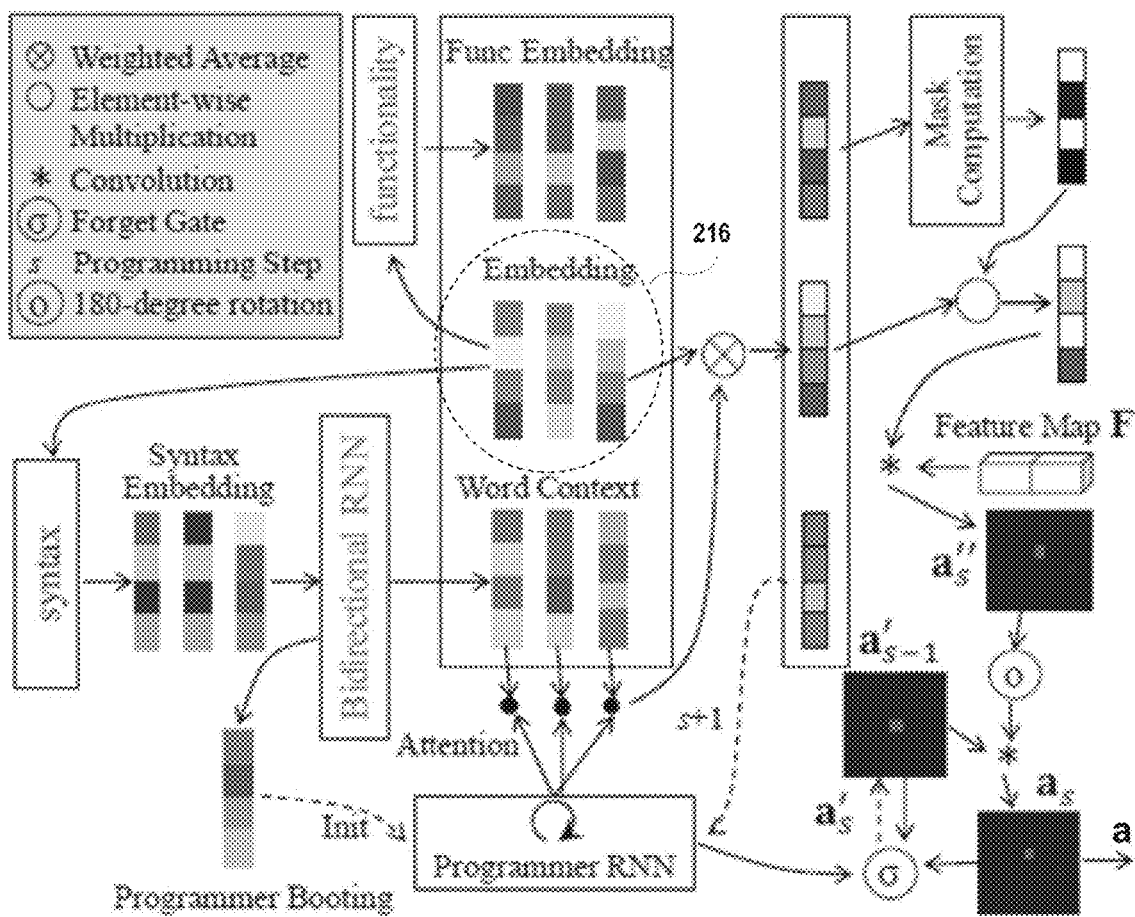
FIG. 3 depicts a pipeline of the programmer of a language module within the compositional framework according to embodiments of the present disclosure.

FIG. 3 depicts a pipeline of a programmer 215 of the language module 210 within the compositional framework 200 according to embodiments of the present disclosure. The programmer receives a sequence of word embeddings and outputs an attention map at the final step. The attention map is fed into the recognition module or the action module, depending on whether the input sentence is a recognition question or a navigation command, for subsequent processes. Detailed flow processes of the programmer 215 will be disclosed in Sections F.1 to Section F.4.

Figure 4:
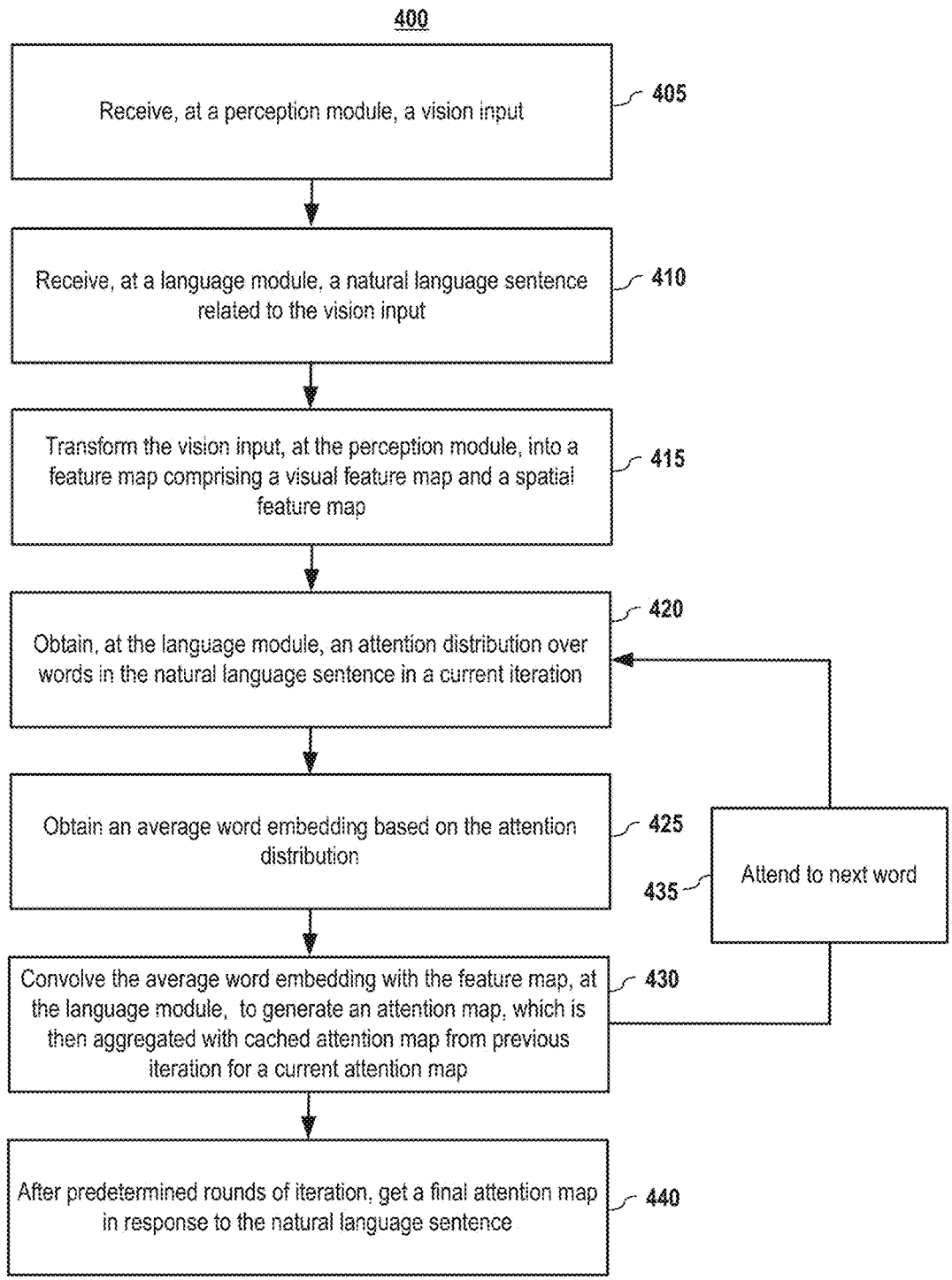
FIG. 4 depicts a method of generating an attention map with the compositional framework according to embodiments of the present disclosure.

FIG. 4 depicts a method 400 of generating an attention map with the compositional framework according to embodiments of the present disclosure. In embodiments, generating an attention map according to a sentence may also be referred as grounding a sentence. In step 405, the perception module 230 receives a vision input, such as an environmental image. In step 410, the language module 210 receives a natural language input comprising one or more words related to the vision input. It should be noted that reference to a sentence or natural language sentence as used in this patent document means a set of one or more words and may not be a complete formal sentence (e.g., it may be a phrase, a command, or a question; it may not start with a capital letter; it may not end with punctuation, etc.). In embodiments, the natural language sentence comprises at least a word not pre-parsed or pre-linked to the visual input. In step 415, the vision input is transformed, at the perception module, into a feature map comprising a visual feature map and a spatial feature map. Details of the feature map generation will be disclosed in Section D.1.

To output a final attention map, there are several "programming" iterations with each iteration involving step 420 through step 430, shown in FIG. 4. In step 420, an attention distribution over words in the natural language sentence is obtained at the language module at a current iteration. Each round of iteration attends or focuses to a different word and thus has a different attention distribution over the words. In some embodiments, the attention of a word in the natural language sentence is determined by at least a global sentential context and a local context at each word. Details of obtaining the attention distribution over words is disclosed in Sections D.2 and D.3. In step 425, an average word embedding is obtained based on the attention distribution. In step 430, the average word embedding is convolved with the feature map at the language module of the framework to generate an attention map. The generated attention map in the current iteration is aggregated with a cached attention map from previous iteration for a current attention map. In step 435, the programmer of the language module attends to next word and the procedure goes back to step 420 to start a new iteration. In step 440, after predetermined rounds of iteration, a final attention map is obtained in response to the natural language sentence. The attention map indicates the target locations for navigation, or indicates which part of the environment to be recognized for recognition.

In embodiments, the design of the framework is driven by the need of navigating under new command C'. Thus, embodiments of the present disclosure focus on how language grounding (shown in FIG. 2(*a*)) and recognition (shown in FIG. 2(*b*)) are related, and how to transfer the knowledge learned in the latter to the former. In embodiments, for an effective knowledge transfer, the framework should possess three properties:

PI: Language grounding and recognition should be reduced to (approximately) the same problem. This ensures that a new word exclusively learned from recognition has already been grounded for attention.

PII: The language module should be compositional. It should process a sentence while preserving the (major) sentence structure. One example would be a parser that outputs a parse tree.

PIII: Inductive bias should be learned from training sentences. The language module should know how to parse a sentence that has a previously seen structure even if a word position of the sentence is filled with a completely new word.

Currently, no existing framework for image captioning or VQA exhibits all such properties. While in theory, binding parameters or embeddings between the language module and the recognition module might satisfy the first property, in practice a naive binding without further architecture support hardly works. It is also difficult, if not impossible, for a simple (gated) Recurrent Neural Network (RNN) to satisfy the last two properties when a sentence has a rich structure. The disclosed framework detailed below is designed exactly for these three properties.

1. Embodiments of Generating Feature Map

In this section, a feature map F is computed, as indicated in step 415 of FIG. 4, as an abstraction of the environment and the agent's egocentric geometry, on which the recognition and grounding of the entire dictionary are performed.

Because of this general computation purpose, the map should not only encode visual information, but also provide spatial features. In embodiments, the feature map is formed by stacking two feature maps $F_v$ and $F_s$ along the channel dimension, which contains some intermediate representation of the image. In some embodiments, the perception module (FIG. 2(*c*)) transforms an environment image into the visual feature map $F_v$ through a Convolutional Neural Network (CNN) 232, whose output has a spatial dimension equal to the number of grids N in the environment, where each pixel corresponds to a grid. The spatial feature map $F_s$ may be a set of randomly initialized parameters. Intuitively, $F_v$ is responsible for the agent's visual sense while $F_s$ is responsible for its direction sense. The agent needs to learn to associate visually-related words with $F_v$ while associate spatially-related words with $F_s$.

2. Embodiments of Recognizing and Grounding a Single Word

To achieve zero-shot navigation, embodiments start with reducing the single-word recognition and grounding to the same problem, after which the reduction is extended to the grounding of a sentence of multiple words (Section D.3). The single-word grounding problem is defined as:

$$F, m \mapsto a, \quad (2)$$

where $F \in \square^{D \times N}$ is a feature map, m is the word index, $a \in \square^N$ is a spatial attention map, and N is the number of pixels. Imagine that the feature map is a collection of slots of features, given a word m, the corresponding slots (highlighted by attention) that match the word semantics need to be found. In a reverse way, the recognition problem is defined as $$F, a \mapsto m. \quad (3)$$

The recognition module (FIG. 2(*b*)) outputs the most possible word for a feature map weighted by attention. This reflects the question-answering process after the agent attending to a region of the environment image according to a question. In the extreme case, when a is a one-hot vector, the module extracts and classifies one slot of feature. Suppose that the extracted feature f=Fa is directly fed to a Softmax layer $P(m|f)=\text{Softmax}_M(s_m^T f)=\text{Softmax}_M((s_m^T F)a)$, where $\text{Softmax}_M$ denotes the Softmax function over M classes and $s_m$ is the parameter vector of the $m^{th}$ class. Notice that the multiplication $s_m^T F$ essentially treats $d_m$ as a 1×1 filter and convolves it with every feature on F. This computation operates as if it is solving the grounding problem in Eq. 1, and it produces an attention map $s_m^T F$ which is optimized towards the following property:

$$s_m^T F \propto \begin{cases} a & m = m^* \\ -a & m \neq m^* \end{cases} \quad (4)$$

where m* is the groundtruth class for f. In other words, this property implies that $s_m$ is grounded in F where the feature of class m locates. This is exactly where it is needed to ground word m with embedding $e_m$. Thus, the Softmax matrix may be set as the transpose of the word embedding table (i.e., $s_m=e_m$). So far, property PI is satisfied for the single-word grounding case, namely, if a new word M+1 is trained to be recognized accurately, then it can also be grounded correctly without being trained to be grounded before.

There may still be considered a flaw in the above definition of recognition. In embodiments, an attention map only tells the agent where, but not what, to focus on. Imagine a scenario in which the agent stands to the east of a red apple. Given an attention map that highlights the agent's west, should the agent answer west, apple, or red? It turns out that the answer should also depend on the question itself, i.e., the question intention has to be understood. Therefore, the recognition problem may be redefined as:

$$F, a, \Phi(Q) \mapsto m, \quad (5)$$

where Q is the question and $\Phi$ computes its intention. In framework embodiments, $\Phi$ is modeled as a gated RNN, which outputs an embedding mask $\in [0, 1]^D$ through Sigmoid. Then, the Softmax distribution becomes:

$$P(m|f)=\text{Softmax}_M((e_m \circ \Phi(Q))^T Fa)= \text{Softmax}_M(e_m^T(\Phi(Q) \circ Fa)) \quad (6)$$

Figure 7:
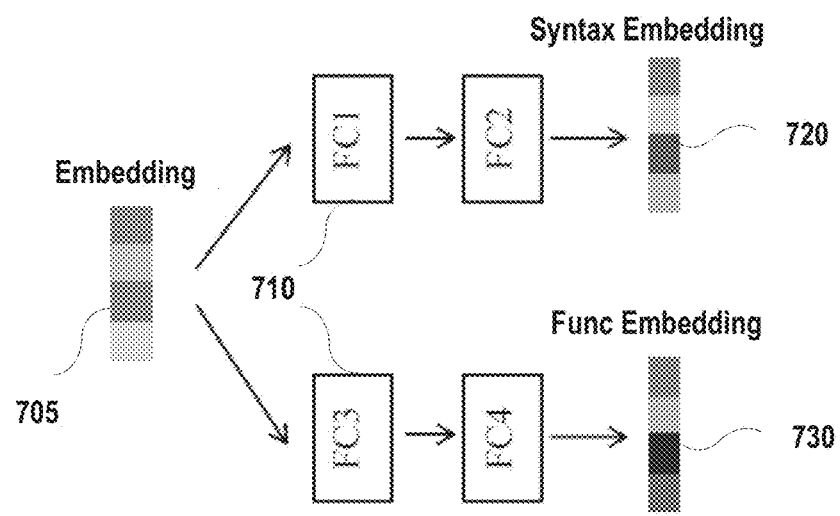
FIG. 7 depicts an illustration of the projections from word embedding to syntax embedding and functionality embedding according to embodiments of the present disclosure.
Figure 8:
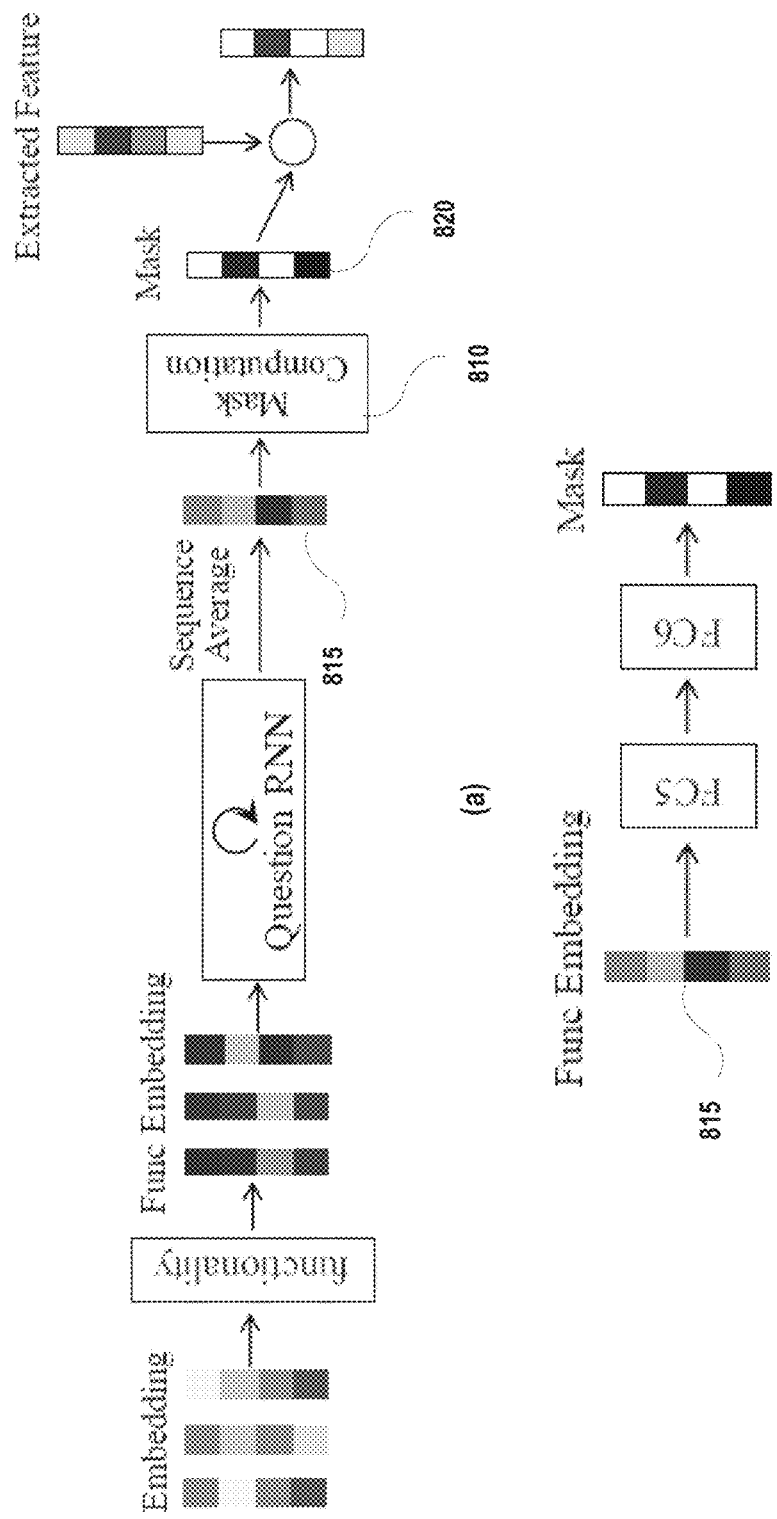
FIG. 8 depicts details of computing the embedding masks according to embodiments of the present disclosure.

(FIG. 2(b)), where ∘ denotes element-wise multiplication. To make property PI still possible, the grounding problem may be modified so that a word embedding is masked before it is grounded:

$$F, m, \Psi(m) \mapsto a, \quad (7)$$

where $\Psi$ is modeled as a projection (the process of going through one or more fully-connected (FC) layers) that outputs an embedding mask through Sigmoid. Intuitively, it enhances the grounding with the ability of selecting features that are relevant to the word being grounded, and this selection is decided by the word itself. Both functions $\Phi$ and $\Psi$ serve as the agent's decision makers on which features to focus on given particular language tokens. They operate on the same intermediate word representation called functionality embedding that is a projection of the word embedding, as shown in FIG. 7. In FIG. 7, word embeddings 705 are projected, via a plurality of FC layers 710, into syntax embeddings 720 and functionality embeddings 730. In embodiments, functionality embedding is exclusively used for computing embedding masks. Additional disclosure of mask computation is shown in FIG. 8.

3. Embodiments of Grounding a Sentence

In embodiments, single-word grounding is extended to sentence grounding while preserving property PI. The high-level idea is that a sentence may be grounded by grounding several individual words of that sentence through several steps, one word per step at a time. In embodiments, the questions to be answered in this section are how to: 1) decide which word to ground at each step; 2) combine the grounding results of individual words to reflect the grounding of the sentence; and 3) make the whole process differentiable.

In embodiments, each sentence (either navigation command or recognition question) may be treated as a program command, and the programming result is an attention map. For navigation, the attended regions indicate the target locations. For recognition, they indicate which part of the environment to be recognized. A core of the disclosed language module 210 is a differentiable programmer 215 that programs a command in several steps, as shown in FIG. 3. The programmer attends to different words at different steps, and uses the attention shifting pattern to implicitly model the sentence structure to satisfy property PII.

In embodiments, to make the programming process differentiable, instead of attending to exactly one word at each step, the programmer computes a soft attention distribution over the words in a sentence. Generally speaking, the attention is determined by the global sentential context, the local context at each word, and the past experience of the programmer. Both global and local contexts may be computed based on an intermediate word representation called syntax embedding that is a projection of the word embedding, as shown in FIG. 7. Intuitively, the syntax embedding can be trained to encode a group of words similarly if they have the same syntactic meaning. Thus, when a sentence contains a new word that was only trained in recognition, the programmer has the inductive bias of programming the sentence as if the new word is an existing word with the same syntactic meaning (property PIII). The details of attention programming are described in Section F.1.

In embodiments, with the word attention at each step s, the averaged word embedding is computed, masked given the corresponding averaged functionality embedding, and convolved with the feature map as in the single-word case (Eq. 7). In embodiments, the convolution result is input to a Softmax layer to get a sum-to-one attention map $a_s''$. Assume that an attention map $a_{s-1}'$ is cached in the previous step. The programmer approximates the 2D translation of spatial attention by $a_s=o(a_s'')*a_{s-1}'$, where o denotes the 180-degree rotation. Then, in embodiments, the programmer caches a new attention map through a forget gate: $a_s'=(1-\sigma)a_{s-1}'+\sigma a_s$, where the gate $\sigma \in [0, 1]$ is computed from the current programmer state (as shown in FIG. 3). At step 0, $a_0'$ may be set as $a_0'=i$, where i is a map whose center pixel is one and the rest are all zeros. Finally, the attention map a at the last step is used as the output of the programmer.

4. Embodiments of Recognition

Figure 5:
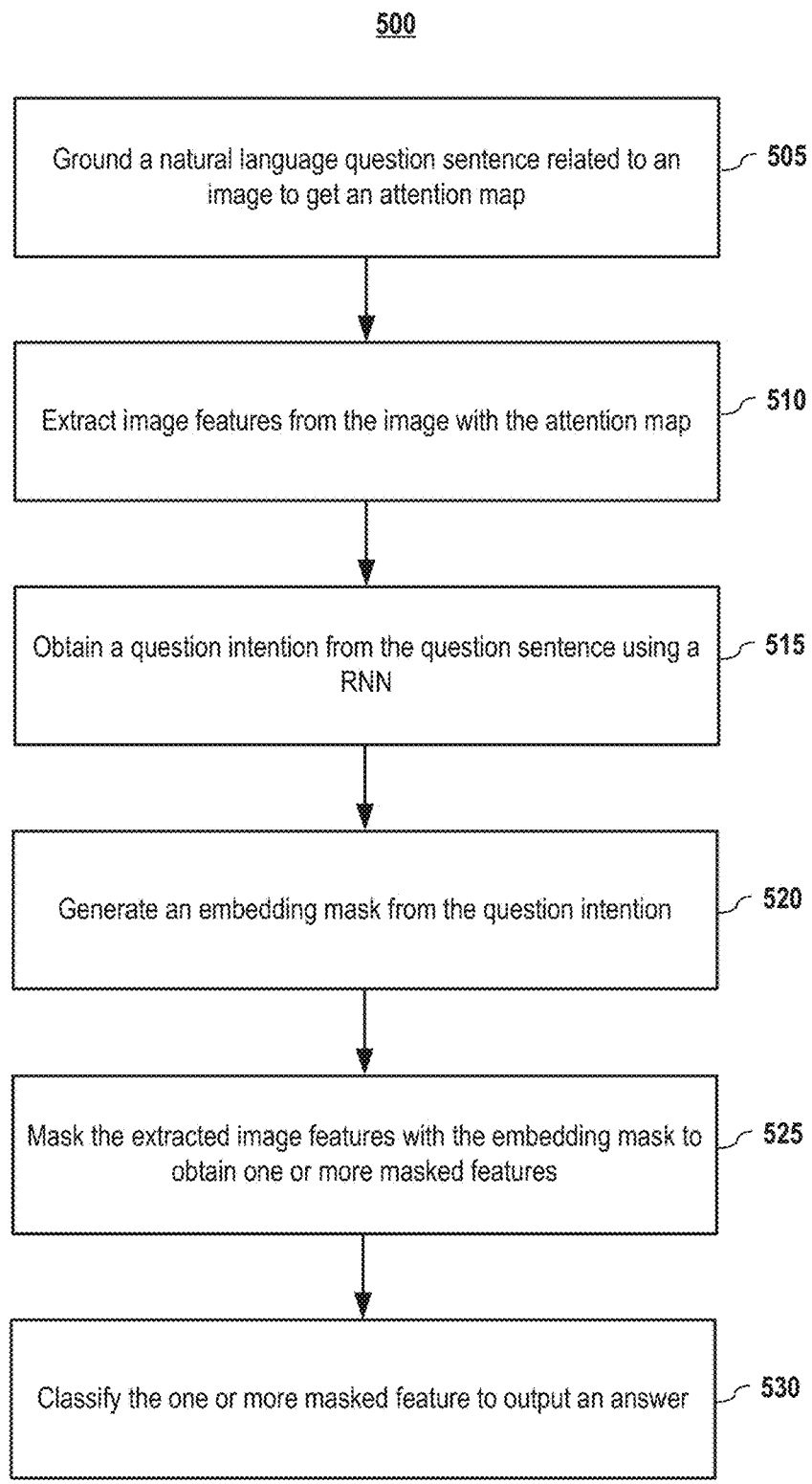
FIG. 5 depicts a method of recognition in response to a recognition question sentence with the compositional framework according to embodiments of the present disclosure.

FIG. 5 depicts a method of recognition in response to a recognition question sentence with the compositional framework according to embodiments of the present disclosure. In step 505, a natural language question sentence related to an image is grounded to get an attention map. Detailed procedures related to grounding a sentence are described in FIG. 4. In step 510, image features are extracted from the image with the attention map. In step 515, a question intention is obtained from the question sentence using a RNN. In step 520, an embedding mask is obtained from the question intention. Some detailed processes of mask generating are also shown in FIG. 8. In step 525, the extracted image feature is masked with the generated mask to get one or more masked feature. The masking process enhances the ability of selecting features that are relevant. In step 530, the one or more masked feature is classified to output an answer to the recognition question sentence.

5. Embodiments of Navigation

Figure 6:
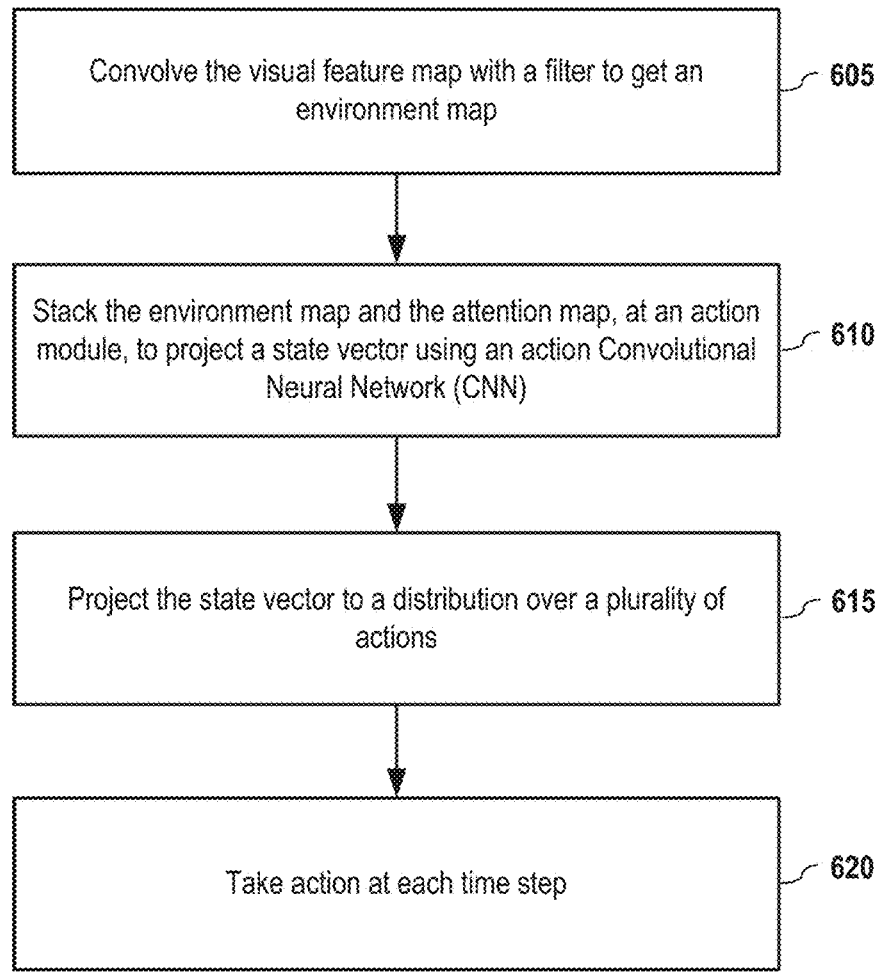
FIG. 6 depicts a method for navigation with a generated attention map according to embodiments of the present disclosure.

In embodiments, a navigation attention map a only defines the target locations. To navigate, the agent needs to know the surrounding environment, including obstacles and distractors. FIG. 6 depicts a method 600 for navigation with the generated navigation attention map a according to embodiments of the present disclosure.

In embodiments, the visual feature map is convolved (605) with a filter to get an environment map. In embodiments, the perception module 230 convolves $F_v$ with a 1×1 filter to get the environment map. The environment map and the generated attention map may be stacked (610), at an action module 240, and then input to an action CNN whose output is projected to a state vector q that summarizes the environment. In embodiments, the state vector is further projected (615) to a distribution π(q, y) over a plurality of actions. Finally, in embodiments, the agent takes action (620) at each step according to the distribution of the plurality of actions. At each time step, the agent takes action y with a probability of α·0.25+(1−α)·π(q, y), where α is the rate of random exploration. The state may also be projected to a scalar V(q) to approximate value function.

E. Embodiments of Training

In this section, additional techniques are described related to embodiments of training the framework.

In embodiment, a training objective contains two sub-objectives $\mathcal{L}(\theta)=\mathcal{L}_{RL}(\theta)+\mathcal{L}_{SL}(\theta)$, one for navigation and the other for recognition, where θ are the joint parameters of the framework. In embodiments, most parameters are shared between the two tasks (in all the figures of the disclosed framework embodiment, components with the same name share the same set of parameters). The recognition loss $\mathcal{L}_{SL}$ may be modeled as the multi-class cross entropy which has the gradients:

$$\nabla_\theta \mathcal{L}_{SL}(\theta)=\mathbb{E}_Q[-\nabla_\theta \log P_\theta(m|f_\theta)] \quad (8)$$

where $\mathbb{E}_Q$ is the expectation over all the questions asked by the teacher in all training sessions, m is the correct answer to each question, and $f_\theta$ is the corresponding feature. The navigation loss $\mathcal{L}_{RL}(\theta)$ may be computed as the negative expected reward $-\mathbb{E}_{\pi_\theta}[r]$ the agent receives by following its policy $\pi_\theta$. With the Actor-Critic (AC) algorithm, the approximate gradients are)

$$\nabla_\theta \mathcal{L}_{RL}(\theta)=-\mathbb{E}_{\pi_\theta}[(\nabla_\theta \log \pi_\theta(q_\theta,\theta)+ \\ \nabla_\theta V_\theta(q_\theta))(r+\gamma V_{\theta^-}(q_{\theta^-})-V_\theta(q_\theta))] \quad (9)$$

where θ— are the target parameters that are periodically (every J minibatches) copied from θ, r is the immediate reward, γ is the discount factor, $q_{\theta^-}$ is the next state after taking action y at state $q_\theta$, and $\pi_\theta$ and $V_\theta$ are the policy and value output by the action module. Since the expectations $\mathbb{E}_Q$ and $\mathbb{E}_{\pi_\theta}$ are different, the two sub-objectives may be optimized separately over the same number of minibatches. For effective training, Curriculum Learning and Experience Replay with Prioritized Sampling are employed (Section F.5).

F. Additional Embodiments and Implementation Information

1. Embodiments of Attention Programming

Figure 9:
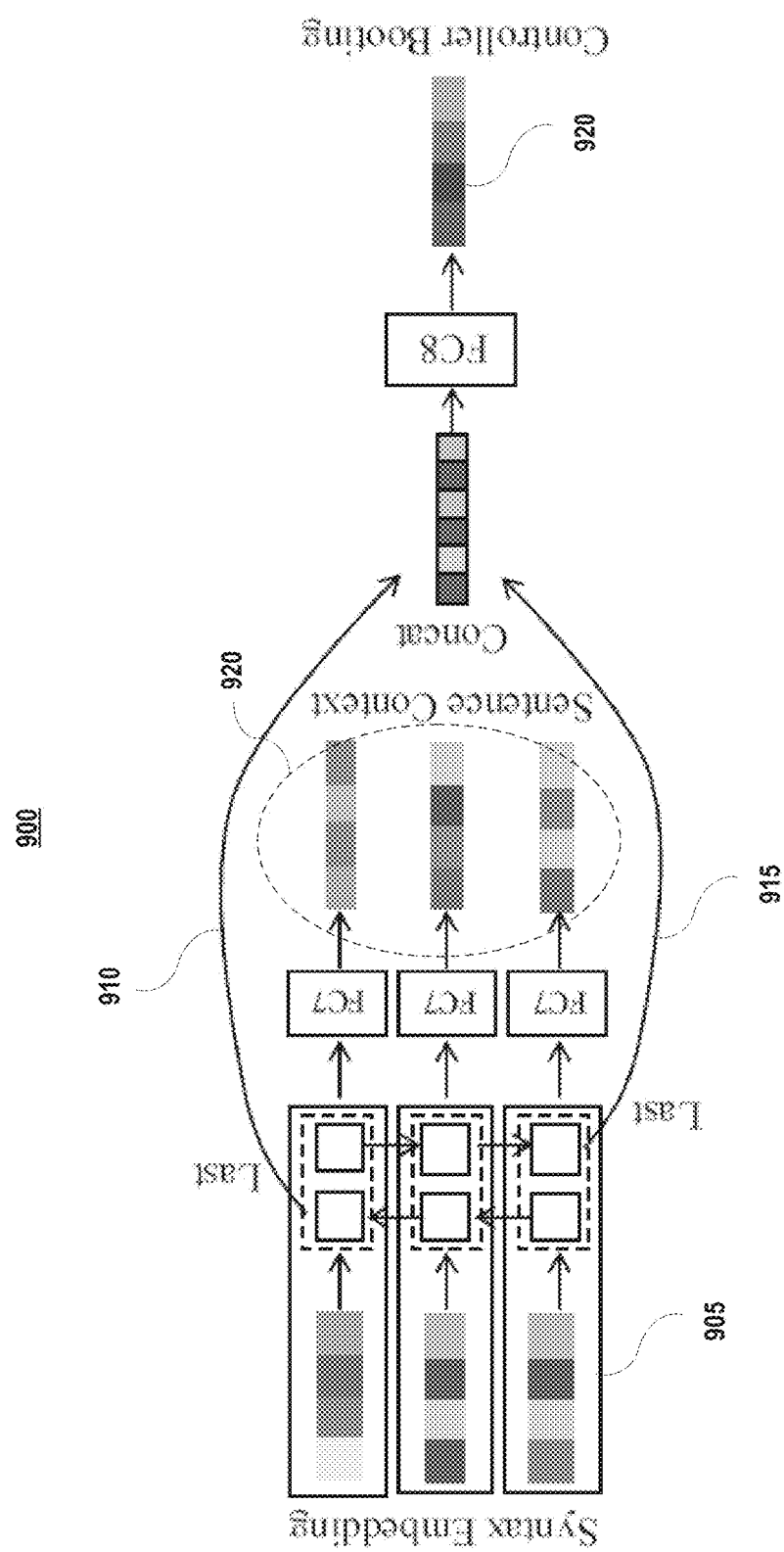
FIG. 9 depicts a Bidirectional RNN receiving a sequence of syntax embeddings, and outputting a sequence of word contexts and an RNN booting vector according to embodiments of the present disclosure.

In embodiments, a sentence of length L is first converted to a sequence of word embeddings $e_l$ by looking up the embedding table E. Then, the embeddings are projected to syntax embeddings (e.g., as shown in FIG. 7). The syntax embeddings 905 are fed into a Bidirectional RNN to obtain word context vectors $e_l^c$ 920. The last forward state 910 and the last backward state 915 are concatenated and projected to a booting vector (controller booting) 920, as shown in FIG. 9, which is used to initialize the programmer RNN (as indicated in FIG. 3). Given a fixed number of programming steps, at each step s the programmer computes the attention for each word l from its context vector $e_l^c$:

$$c_{s,l} = Softmax_L(CosSim(h_s, g(We_l^c + b))) \quad (10)$$

$$CosSim(z, z') = \frac{z^\top z'}{\|z\|\|z'\|} \quad (11)$$

where W and b are projection parameters, $h_s$ is the RNN state, g is the activation function, and $Softmax_L$ is the Softmax function over L words. Then, the context vectors $e_l^c$ are weighted averaged by the attention and fed back to the RNN to tell it how to update its hidden state.

Compared to Neural Module Networks, embodiments of soft word attention implicitly supports the CombineAnd and CombineOr operations by attending to multiple words simultaneously. Moreover, the embedding masks produced by Φ and Ψ support switching among the DescribeColor, DescribeLocation, and DescribeName operations by masking word embeddings according to given language tokens. As a result, a simple yet effective implementation of a modular network is finally obtained.

2. Embodiments of Implementation Details

In embodiments, the agent at each time step receives a 156×156 RGB image. This image is egocentric, or in configured to be egocentric by including both the environment and a padding region. In embodiments, the agent processes the input image with a CNN that has four convolutional layers: (3, 3, 64), (2, 2, 64), (2, 2, 512), (1, 1, 512), where (x, y, z) represents z×x x filters with stride y, and all the four layers have the ReLU activation function. The output is the visual feature map with 512 channels. It may be stacked along the channel dimension with another parametric spatial feature map of the same sizes. In embodiments, this spatial feature map is initialized with zero mean and standard deviation (FIG. 2(c)).

In embodiment, the agent also receives a navigation command at the beginning of a session, and the same command is repeated until the end of the session. The agent may or may not receive a question at every time step. In embodiments, the dimensions of the word embedding, syntax embedding, and functionality embedding are 1024, 128, and 128, respectively. In embodiments, the word embedding table may be initialized with zero mean and a standard deviation of 1. In embodiments, the hidden FC layers for computing the syntax and functionality embeddings have 512 units (FIG. 7). In embodiments, the bidirectional RNN for computing word contexts has a state size of 128 in both directions. In embodiments, the output RNN booting vector and word context also have a length of 128. In embodiments, the state size of the programmer RNN is equal to the length of the booting vector (FIG. 3). In embodiments, the hidden FC layer for converting a functionality embedding to an embedding mask has a size of 128. In embodiments, the RNN used for summarizing the question intention has 128 states (FIG. 8). FIG. 8 depicts details of computing the embedding masks according to embodiments of the present disclosure. Specifically, FIG. 8(a) shows an embodiment of the pipeline of Question Intention in FIG. 3. FIG. 8(b) shows that an embodiment of the two FC layers used by Mask Computation 810 to project a functionality embedding 815 for the generation of the mask 820. In embodiments, all FC layers and RNN states in the language and recognition module use Tan h as the activation function. In embodiments, the only exception may be the FC layer that outputs the embedding mask (Sigmoid).

In embodiments of the action module, the action CNN for processing the attention map and the environment map has two convolutional layers (3, 1, 64) and (3, 1, 4), both with paddings of 1. They may be followed by three FC layers that all have 512 units. In embodiments, all five layers use the ReLU activation function.

3. Baseline Model Embodiments

In embodiments, the language module of SimpleAttention sets the word embedding size to 1024, and the RNN has the same size with the word embedding. In embodiments, the FC layer that produces the 3×3 filter has an output size of 4608, which is 9 times the channel number of the visual feature map. In embodiments, the rest of the layer configuration is the same with the disclosed framework. In embodiments, VIS-LSTM has a CNN with four convolutional layers (3, 2, 64), (3, 2, 64), (3, 2, 128), and (3, 1, 128). This may be followed by three FC layers with size 1024. In embodiments, the word embedding and the RNN both have sizes of 1024. In embodiments, the RNN output goes through three FC hidden layers of size 512 either for recognition or navigation. In embodiments, the layer size configuration of Multimodal is the same with VIS-LSTM. The outputs of all layers here are ReLU activated except for the last FC layer of the CNN used by VIS-LSTM. The activation is instead linear so that the output image embedding is in the same space with the word embedding. In embodiments, except for SimpleAttention, the transposed Softmax matrix is not tied to the embedding table.

4. XWORLD Embodiment Setup

In embodiments, square environments were configured with sizes ranging from 3 to 7. The size of the environment image was fixed by padding walls for smaller environments. Different sessions may have different map sizes. In each session:

- The number of time steps T is four times the map size.
- The number of objects on the map is from 1 to 3.
- The number of wall grids on the map is from 0 to 10.
- The positive reward when the agent reaches the correct location was set to 1. The negative rewards for hitting walls and for stepping on non-target objects were set to −0.2 and −1, respectively. The time step penalty was set to −0.1.

The teacher has a vocabulary size of 104, including 2 punctuation marks. There are 9 locations, 4 colors, and 40 distinct object classes. Each object class has 2.85 object instances on average. Every time the environment is reset, a number of object classes are randomly sampled and an object instance is randomly sampled for each class. There are in total 16 types of sentences the teacher can speak, including 4 types of navigation commands and 12 types of recognition questions. Each sentence type has multiple non-recursive natural-language templates, and corresponds to a subtask the agent must learn to perform. In total, there are 256,832 distinct sentences with 92,442 for the navigation task and 164,390 for the recognition task. The sentence length ranges from 2 to 12.

The object, location, and color words of the teacher's language are listed below. These are the content words with actual meanings that can be grounded in the environment. All the other words are treated as grammatical words whose embeddings are only for interpreting sentence structures. The differentiation between content and grammatical words is automatically learned by the agent based on the teacher's language and the environment. All words have the same form of representation.

| Object | Location | Color | Other |
|---|---|---|---|
| apple, avocado, banana, blueberry, butterfly, cabbage, cat, cherry, circle, coconut, cucumber, deer, dog, elephant, fig, fish, frog, grape, hedgehog, ladybug, lemon, lion, monkey, octopus, orange, owl, panda, penguin, pineapple, pumpkin, rabbit, snake, square, squirrel, star, strawberry, triangle, turkey, turtle, watermelon | east, west, north, south, northeast, northwest, southeast, southwest, between | green, red, blue, yellow | ?, ., and, block, by, can, color, could, destination, direction, does, find, go, goal, grid, have, identify, in, is, locate, located, location, me, move, name, navigate, near, nothing, object, of, on, one, OOV, please, property, reach, say, side, target, tell, the, thing, three, to, two, what, where, which, will, you, your |

The sentence types that the teacher can speak are listed below. Each sentence type corresponds to a subtask. The triggering condition describes when the teacher says that type of sentences. Besides the conditions shown, an extra condition for navigation commands is that the target location must be reachable from the current agent location. An extra condition for color-related questions is that the object color must be one of the four defined colors, and objects with other colors will be ignored in these questions. If at a time step there are multiple conditions triggered, one sentence type for navigation and another for recognition are randomly sampled. After the sentence type is sampled, the command or question is generated according to the corresponding sentence templates.

| Sentence Type (Subtask) | Example | Triggering Condition |
|---|---|---|
| nav_obj | Please go to the apple. | [C0] Beginning of a session. & [C1] The referred object has a unique name. |
| nav_col_obj | Could you please move to the red apple? | [C0] & [C2] There are multiple objects that either have the same name but different colors, or have different names but the same color. |
| nav_nr_obj | The north of the apple is your destination. | [C0] & [C1] |
| nav_bw_obj | Navigate to the grid between apple and banana please. | [C0] & [C3] Both referred objects have unique names and are separated by one grid. |
| rec_col2obj | What is the red object? | [C4] There is only one object that has the referred color. |
| rec_obj2col | What is the color of the apple? | [C1] |
| rec_loc2obj | Please tell the name of the object in the south. | [C5] The agent is near the referred object. |
| rec_obj2loc | What is the location of the apple? | [C1] & [C5] |
| rec_loc2col | What color does the object in the east have? | [C5] |
| rec_col2loc | Where is the red object located? | [C4] & [C5] |
| rec_loc_obj2obj | Identify the object which is in the east of the apple. | [C1] & [C6] The referred object is near another object |
| rec_loc_obj2col | What is the color of the east to the apple? | [C1] & [C6] |
| rec_col_obj2loc | Where is the red apple? | [C2] & [C5] |
| rec_bw_obj2obj | What is the object between apple and banana? | [C7] Both referred objects have unique names and are separated by one object. |
| rec_bw_obj2loc | Where is the object between apple and banana? | [C7] & [C8] The agent is near the object in the middle. |
| rec_bw_obj2col | What is the color of the object between apple and banana? | [C7] |

5. Experience Replay and Curriculum Learning Embodiments

In embodiments, Experience Replay was employed for training both the navigation and recognition tasks. The environment inputs, rewards, and the actions taken by the agent at the most recent 10 k time steps are stored in a replay buffer. During training, every time two minibatches of the same number of experiences are sampled from the buffer, one for computing $\nabla_\theta \mathcal{L}_{SL}(\theta)$ and the other for computing $\nabla_\theta \mathcal{L}_{RL}(\theta)$. For the former, in embodiments, individual experiences are sampled. experiences are uniformly sampled from a subset of the buffer which contains the teacher's questions. For the latter, transitions (i.e., pairs of experiences) are sampled so that temporal difference (TD) error can be computed. In embodiments, the entire buffer is sampled using the Rank-based Sampler. which has proven to increase the learning efficiency by prioritizing rare experiences in the buffer.

Because in the beginning the language is quite ambiguous, it is difficult for the agent to start learning with a complex environment setup. Thus, Curriculum Learning is exploited to gradually increase the environment complexity. The following things are gradually changed linearly in proportional to min(1, G'/G), where G' is the number of sessions so far and G is the number of curriculum sessions:

The number of grids of the environment.
The number of objects in the environment.
The number of wall grids.
The number of possible object classes that can appear in the environment.
The length of a navigation command or a recognition question.

It was found that, in embodiments, this curriculum can be important for efficient learning, because in the early phase the agent is able to quickly master the meanings of the location and color words given only small ambiguity. After this, these words are used to guide the optimization when more and more new sentence structures and objects are added. In the experiments, G=10 k during training while do not use any curriculum during test (maximal difficulty).

G. Experiments

It shall be noted that these experiments and results are provided by way of illustration and were performed under specific conditions using a specific embodiment or embodiments; accordingly, neither these experiments nor their results shall be used to limit the scope of the disclosure of the current patent disclosure.

In embodiments, Adagrad (see Duchi et al., *Adaptive subgradient methods for online learning and stochastic optimization*, Journal of Machine Learning Research, 12(July):2121-2159, 2011) is used with a learning rate of $10^{-5}$ for Stochastic Gradient Descent (SGD). In all experiments, the batch size is set to 16 and train 200 k batches. The target parameters $\theta^-$ are updated every J=2 k batches. The reward discount factor $\gamma$ is set to 0.99. All the parameters have a default weight decay equal to $10^{-4} \times$batch size. For each layer, by default its parameters have zero mean and a standard deviation of $1/\sqrt{K}$, where K is the number of parameters of that layer. The agent has 500 k exploration steps in total, and the exploration rate $\alpha$ decreases linearly from 1 to 0. The number of programming steps is fixed as 3, and each model is trained with 4 random initializations. The whole framework is implemented with PaddlePaddle (https://github.com/PaddlePaddle/Paddle/) and trained end to end. More implementation details are provided in Section F.2.

Zero-shot Navigation.

A primary question is whether the agent has the zero-shot navigation ability of executing previously unseen commands. Four command conditions for training the agent are setup.

Standard The training command set has the same distribution with the test command set.

NC Some word combinations are excluded from the training command set, even though all the words are in it. Three types of word combinations are specifically considered: (object, location), (object, color), and (object, object). All combinations are enumerated for each type and randomly hold out 10% from the teacher in navigation.

NWNav & NWNavRec Some object words are excluded from navigation training, and are trained only in recognition and tested in navigation as new concepts. NWNavRec guarantees that the new words will not appear in questions but only in answers while NWNav does not. 10% of the object words are randomly held out.

Figure 16:
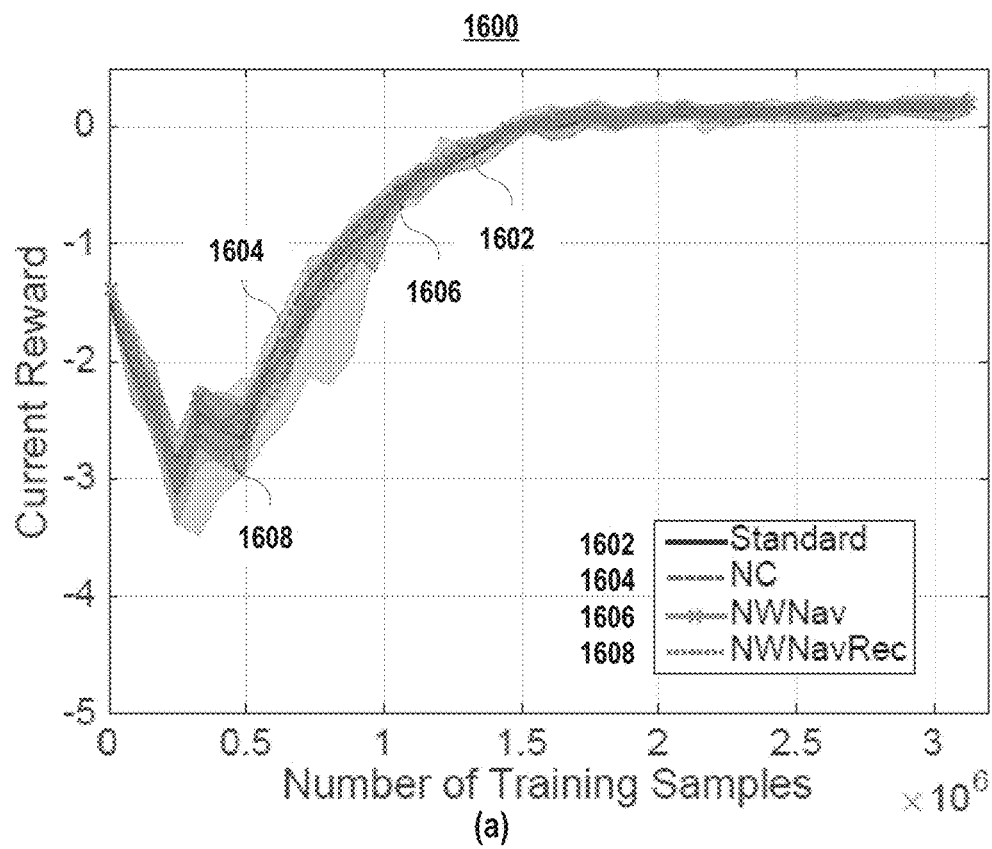
FIG. 16 depicts an illustration of training rewards curves according to embodiments of the present disclosure.
Figure 16:
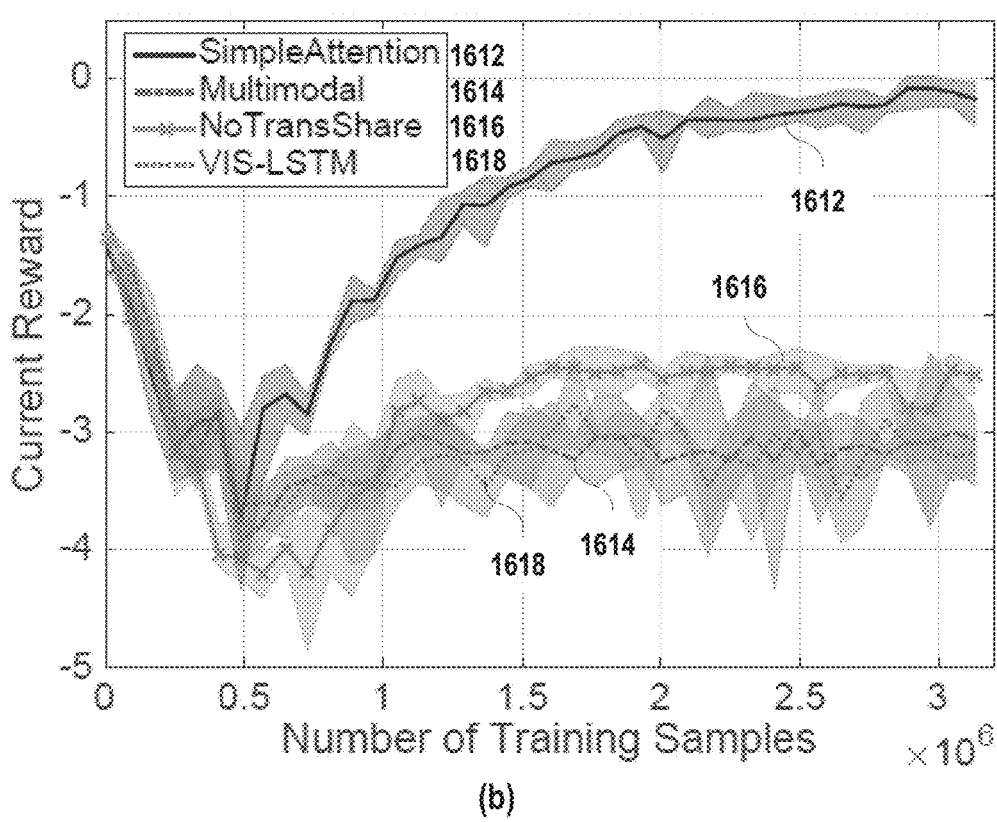

Framework embodiments were trained under each condition with the same hyperparameters. For testing, the held-out combinations/words are put back to the commands (i.e., Standard condition) and test 10k sessions in total over four navigation subtasks nav_obj, nav_col_obj, nav_nr_obj, and nav_bw_obj (Section F.4). The success rates are computed, where success means that the agent reaches the target location in time in a session. FIG. 16(a) shows the training reward curves 1602, 1604, 1606, and 1608, and Table 1(a) contains the success rates. The curves are close to each other, which is expected because a 10% reduction of the commands barely changes the learning difficulty. Almost the same success rates are obtained for all the conditions, and obtain high zero-shot success rates. The results of NWNavRec show that although some new object concepts are learned from a completely different problem, they can be tested on navigation without any model retraining or fine tuning.

TABLE 1

Success rates (%)

(a) Breakdown rates of the disclosed framework and SimpleAttention (SA) on the four subtasks under different training command conditions (columns). The last four rows show the rates of the test sessions that contain commands not seen in training

| Ours/SA | Standard | NC | NWNav | NWNavRec |
| --- | --- | --- | --- | --- |
| nav_obj | 94.6/91.6 | 94.6/91.8 | 94.6/91.7 | 94.2/83.4 |
| nav_col_obj | 94.3/88.8 | 93.2/89.6 | 94.1/89.6 | 94.0/83.4 |
| nav_nr_obj | 93.1/74.5 | 92.7/74.2 | 93.0/77.2 | 93.0/70.8 |
| nav_bw_obj | 73.9/69.3 | 75.3/70.1 | 74.5/70.8 | 73.7/69.3 |
| *nav_obj | N/A | 93.8/90.6 | 94.5/88.3 | 94.7/4.1 |
| *nav_col_obj | N/A | 93.1/87.3 | 93.8/81.8 | 92.8/7.0 |
| *nav_nr_obj | N/A | 92.6/71.6 | 92.7/56.6 | 87.1/25.7 |
| *nav_bw_obj | N/A | 76.3/70.2 | 74.5/66.1 | 70.4/59.7 |

(b) Overall rates of all the methods under the Standard command condition

| Ours | SimpleAttention | NoTranshare | VIS-LSTM | MultiModal |
| --- | --- | --- | --- | --- |
| 89.2 | 80.0 | 6.9 | 22.4 | 22.3 |

Baselines

Figure 10:
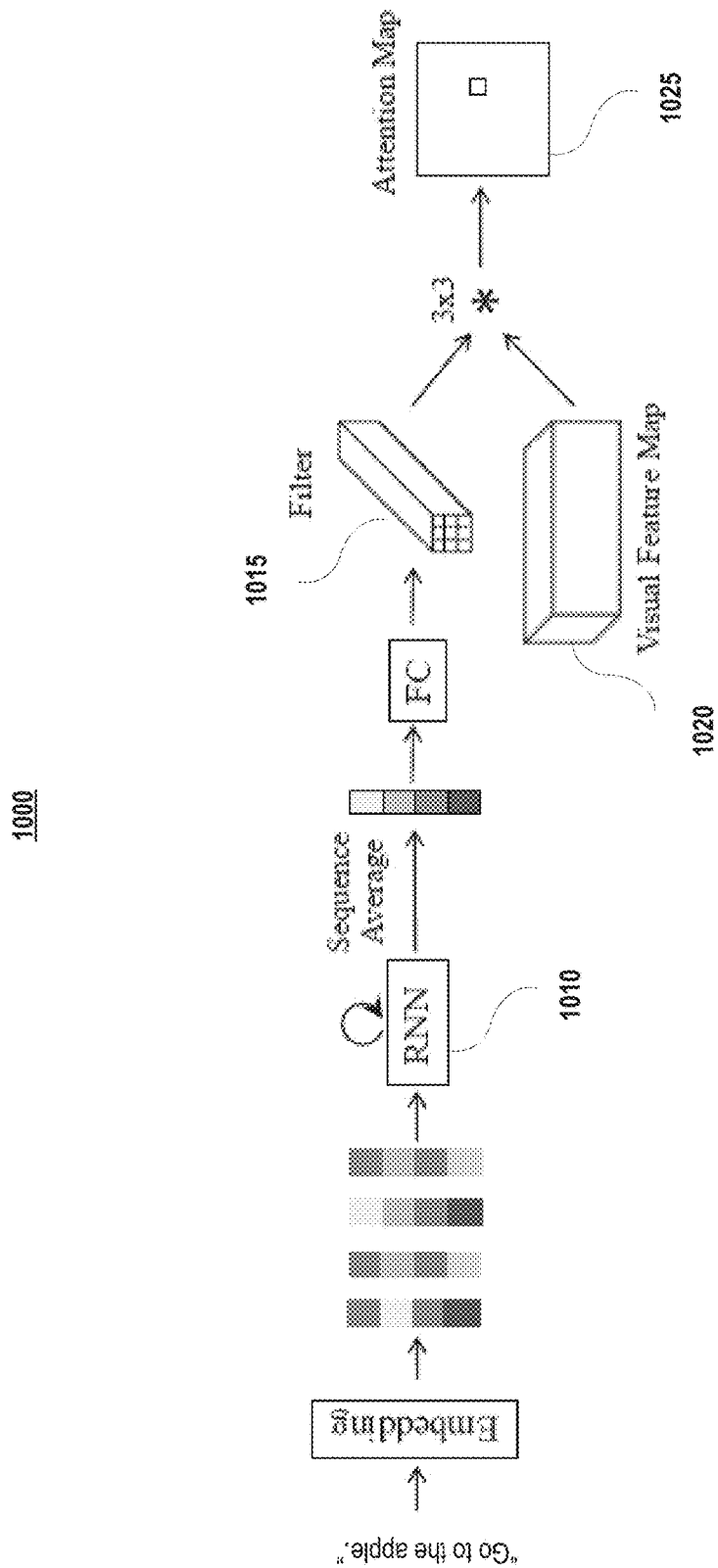
FIG. 10 depicts a pipeline of the language module of the SimpleAttention baseline according to embodiments of the present disclosure.

To demonstrate that the presented framework architecture is necessary, four baselines are tested:

SimpleAttention: FIG. 10 depicts a pipeline 1000 of the language module of the SimpleAttention baseline according to embodiments of the present disclosure. A framework embodiment was modified by replacing the programmer with a simple attention model. Given a sentence, an RNN 1010 is used to output an embedding 1015 which is convolved as a 3×3 filter with the visual feature map 1020 (extracted from the Environment image at the perception module 230) to get an attention map. The rest of the framework is unchanged. This baseline is an ablation to show the necessity of the programmer.

NoTransShare: The word embedding table is not tied to the transposed Softmax matrix. In this case, language grounding and recognition are not the same problem. This baseline is an ablation to show the impact of the transposed sharing on the training convergence.

Figure 11:
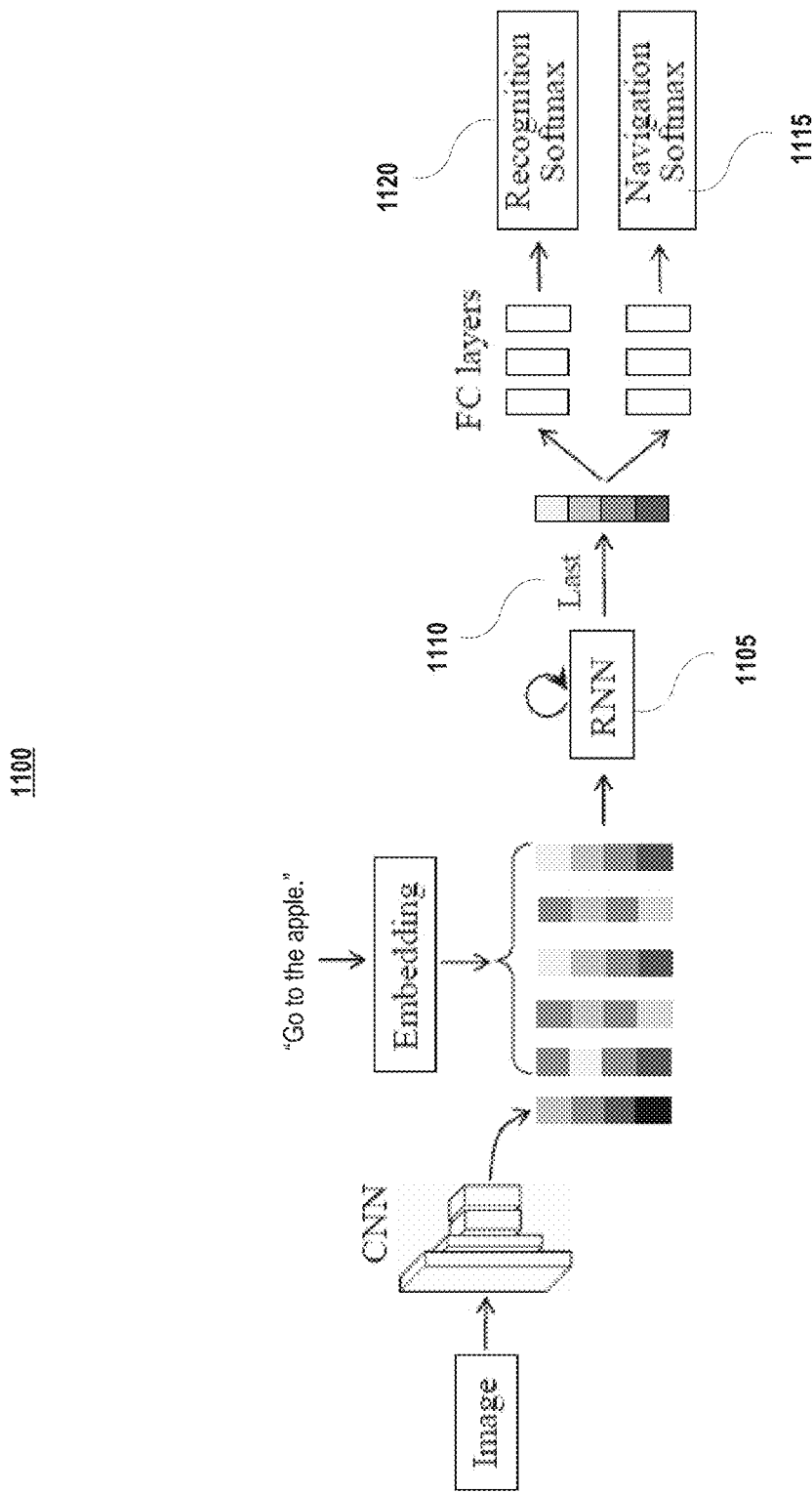
FIG. 11 depicts an adapted version of the VIS-LSTM model for the deep compositional framework according to embodiments of the present disclosure.

VIS-LSTM: Following Ren et al., CNN is used to get an image embedding which is then projected to the word embedding space and used as the first word of the sentence. The sentence goes through an RNN 1105 whose last state 1110 is used, via one or more FC layers, for navigation softmax 1115 and recognition softmax 1120, as shown in FIG. 11. The framework 1100 treats the projected image embedding as the first word of the sentence. Navigation and recognition only differ in the last several FC layers.

Figure 12:
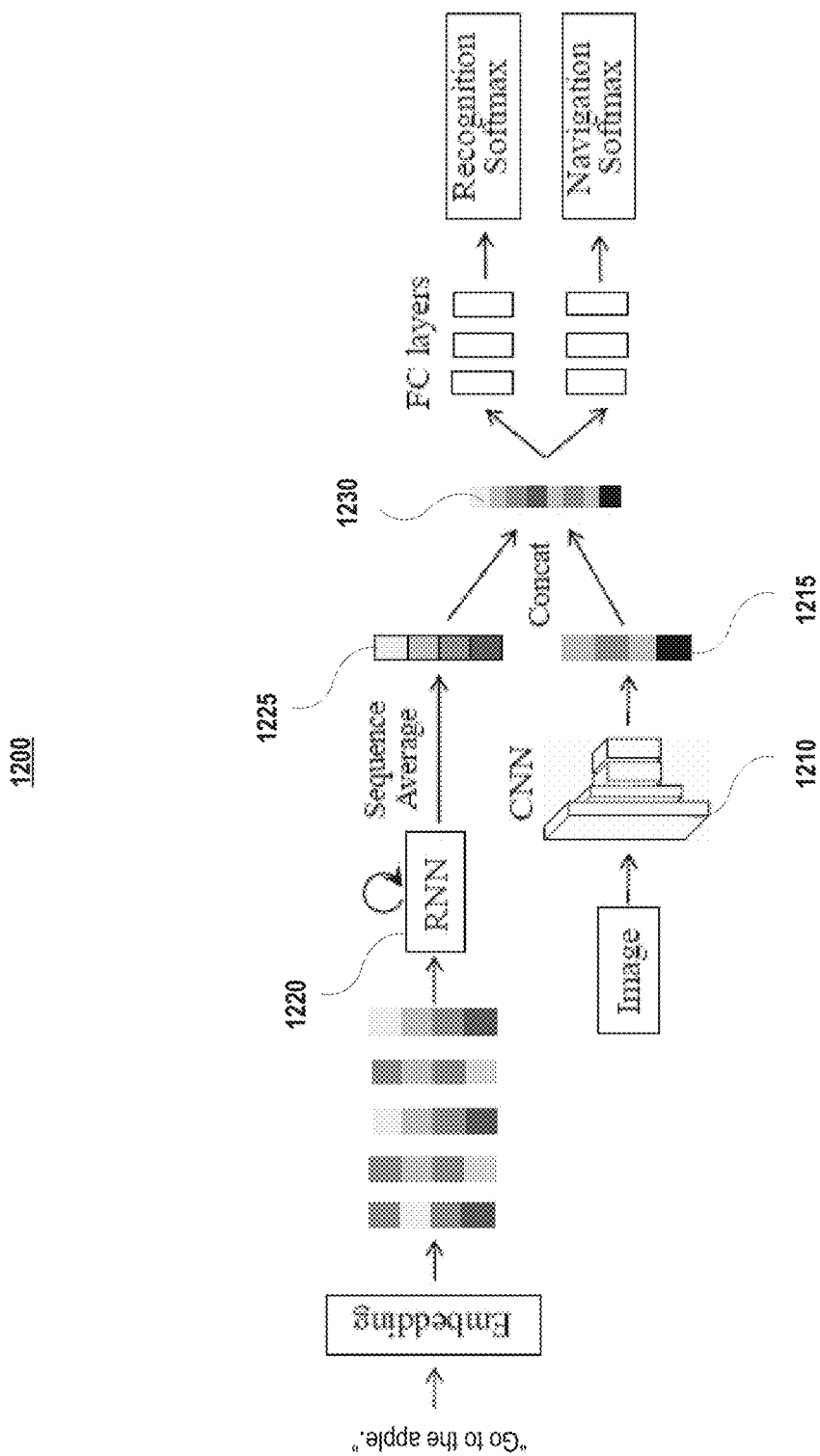
FIG. 12 depicts a multimodal framework according to embodiments of the present disclosure.

Multimodal: FIG. 12 depicts a multimodal framework 1200 according to embodiments of the present disclosure. A multimodal framework is implemented as shown in FIG. 12. The framework uses CNN 1210 to get an image embedding 1215 and RNN 1220 to get a sentence embedding 1225. Then the two embeddings are concatenated and projected to a common feature space 1230 for navigation and recognition. Navigation and recognition only differ in the last several FC layers.

The last three baselines are trained under the Standard command condition, where their performance is already very poor. SimpleAttention is trained under all the four command conditions. Again, these baselines are tested for 10 k sessions. The training reward curves 1612, 1614, 1616, and 1618, and the success rates are shown in FIG. 16(b) and Table 1, respectively. VIS-LSTM and Multimodal have poor results because they do not ground language in vision. Surprisingly, NoTransShare converges much slower than the disclosed framework does. One possible reason is that the correct behavior of the language module is hard to be found by SGD if no constraint on word embedding is imposed. Although SimpleAttention is able to perform well, without word-attention programming, its ability of sentence understanding is limited. More importantly, Table 1(a) shows that it almost fails on zero-shot commands (especially on NWNavRec). Interestingly, in nav_bw_obj it has a much higher zero-shot success rate than in the other subtasks. The reason is that with the 3×3 filter, it always highlights the location between two objects without detecting their classes, because usually there is only one qualified pair of objects in the environment for nav_bw_obj. In such case, SimpleAttention does not really generalize to unseen commands.

Visualization and Analysis

Figure 13:
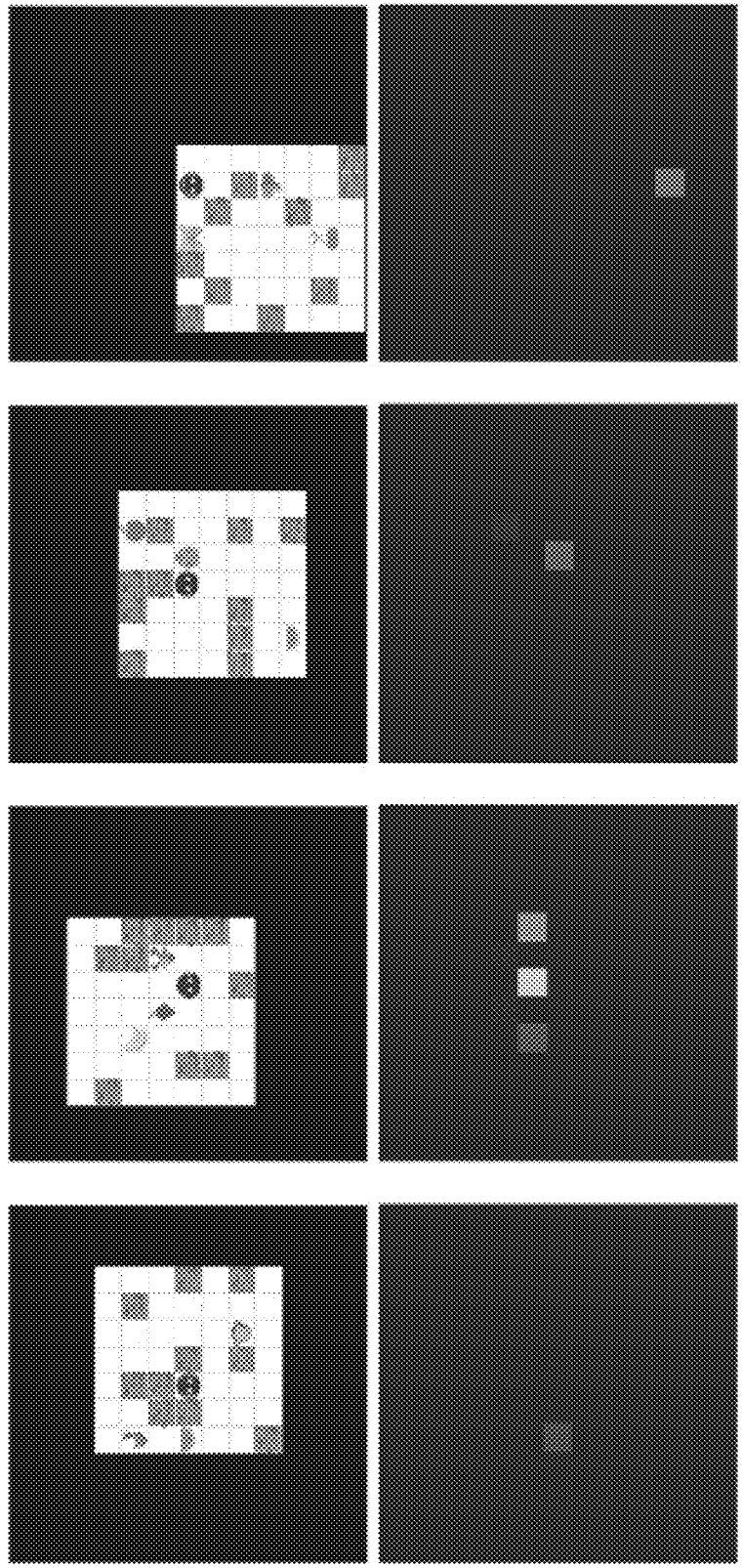
FIG. 13 depicts examples of attention maps in different sessions according to embodiments of the present disclosure.

The presented framework produces intermediate results that can be easily visualized and analyzed. One example has been shown in FIG. 2, where the environment map is produced by a trained perception module. It detects exactly all the obstacles and goals. The map constitutes the learned prior knowledge for navigation: all walls and goals should be avoided by default because they incur negative rewards. This prior, combined with the attention map produced for a command, contains all information the agent needs to navigate. The attention maps are usually very precise, as shown in FIG. 13, with some rare cases in which there are flaws, e.g., when the agent needs to navigate between two objects. This is due to a simplified assumption on 2D geometric translation: the attention map of a location word is treated as a filter and the translation is modeled as convolution. This results in attention diffusion in the above case. To address this issue, more complicated transformation can be used (e.g., FC layers). In FIG. 13, the navigation commands are located at the top, the current environment images are located in the middle; and the corresponding attention maps output by the language module are located at the bottom.

Figure 14:
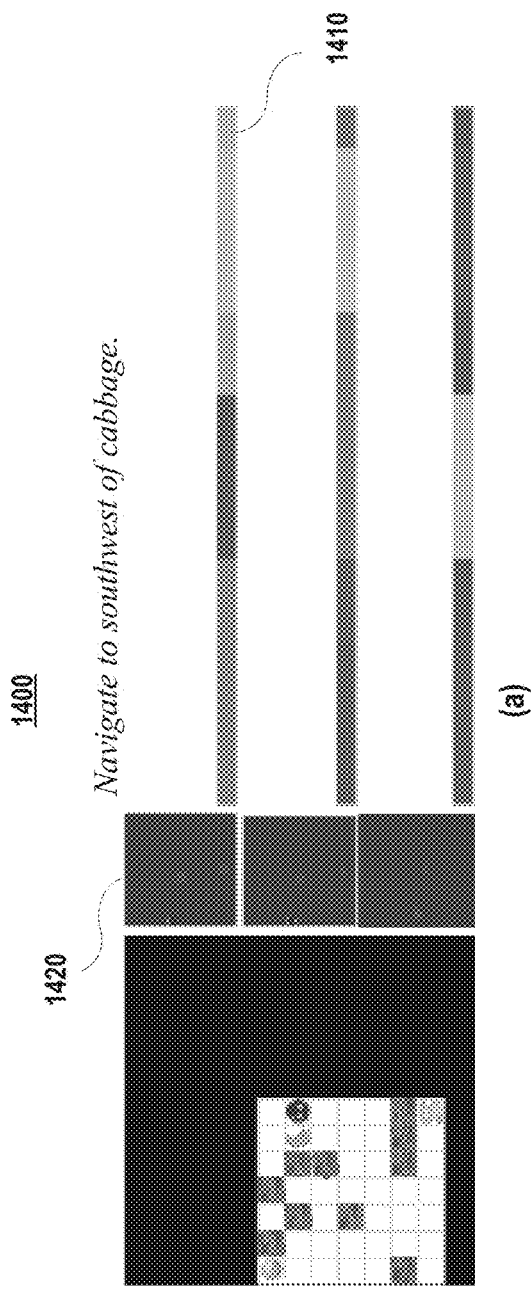
FIG. 14 depicts the attention programming process on two examples according to embodiments of the present disclosure.
Figure 14:
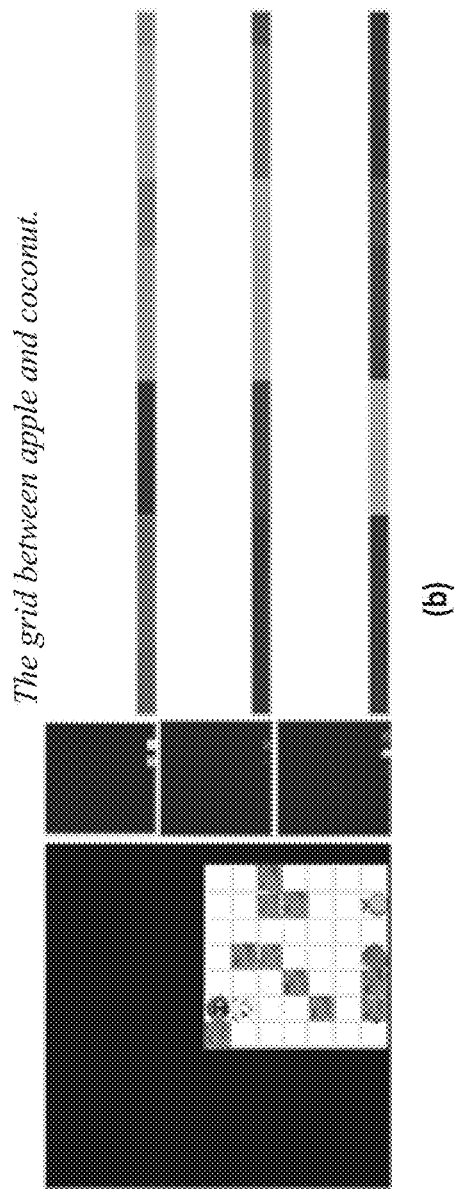

The programming process is also visualized. It is observed that the programmer is able to shift its focus across steps (FIG. 14). In the first example shown in FIG. 14(a), the programmer essentially does Transform[southeast](Find [cabbage](F)). In the second example shown in FIG. 14(b), it essentially performs Transform[between](CombineOr (Find[apple](F), Find[coconut](F))). Given the current environment image and a navigation command, the programmer generates an attention map in three steps. At each step, the programmer focuses on a different portion of the sentence. The word attention is visualized by a strip 1410 where brighter portion on the strip has more attention than darker portion on the strip. On the left of each strip is the corresponding attention map 1420 combining the current attention and the previously cached one. The last attention map is used as the output of the programmer.

Figure 15:
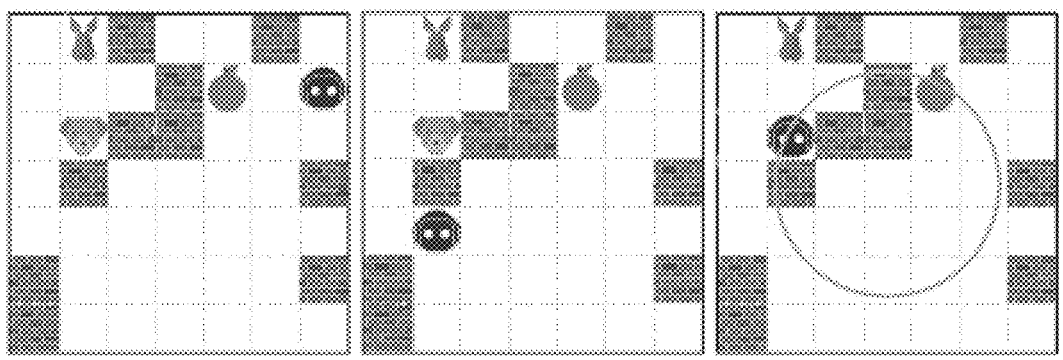
FIG. 15 depicts examples of bypassing long walls in response to navigation commands according to embodiments of the present disclosure.
Figure 15:
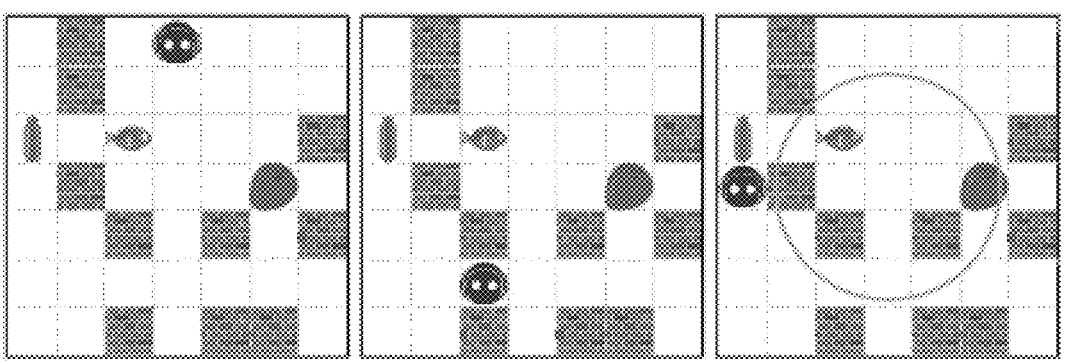

It is found the attention and environment maps very reliable through visualization. This is verified by the ~100% QA accuracy in recognition. However, in Table 1 the best success rate is still ~5% away from the perfect. Further analysis reveals that the agent tends to get stuck in a loop if the target location is behind a long wall, although it has a certain chance to bypass it, as shown in FIG. 15 (only three key steps are shown for each path, and the circles indicate success). Thus it is believed that the discrepancy between the good map quality and the imperfect performance results from the disclosed action module. Currently the action module learns a direct mapping from an environment state to an action. There is no support for either history remembering or route planning. Since the focus here is zero-shot navigation, such improvements are left to future work.

H. Some Conclusions

Embodiments of an end-to-end compositional framework for a virtual agent to generalize an existing skill to new concepts without model retraining or fine-tuning have been shown. Such generalization is made possible, in embodiments, by reusing knowledge that is learned in other tasks and encoded by language. By assembling words in different ways, the agent is able to tackle new tasks while exploiting existing knowledge. Such ability is crucial for fast learning and good generalization. These important ideas are reflected in the design of the disclosed framework and applied to a concrete example: zero-shot navigation in XWORLD. The presented framework embodiments are some possible implementations; one skilled in the art shall recognize that certain components of the framework may be altered. The claim is not that an intelligent agent must have a mental model as the presented one, but it should possess several properties discussed in Section D. Currently, the agent explores in a 2D environment. It should be noted that the agent may operate in a 3D world. The current framework embodiments provide insights on how to train a similar agent in a 3D environment.

I. System Embodiments

In embodiments, aspects of the present patent disclosure may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 17:
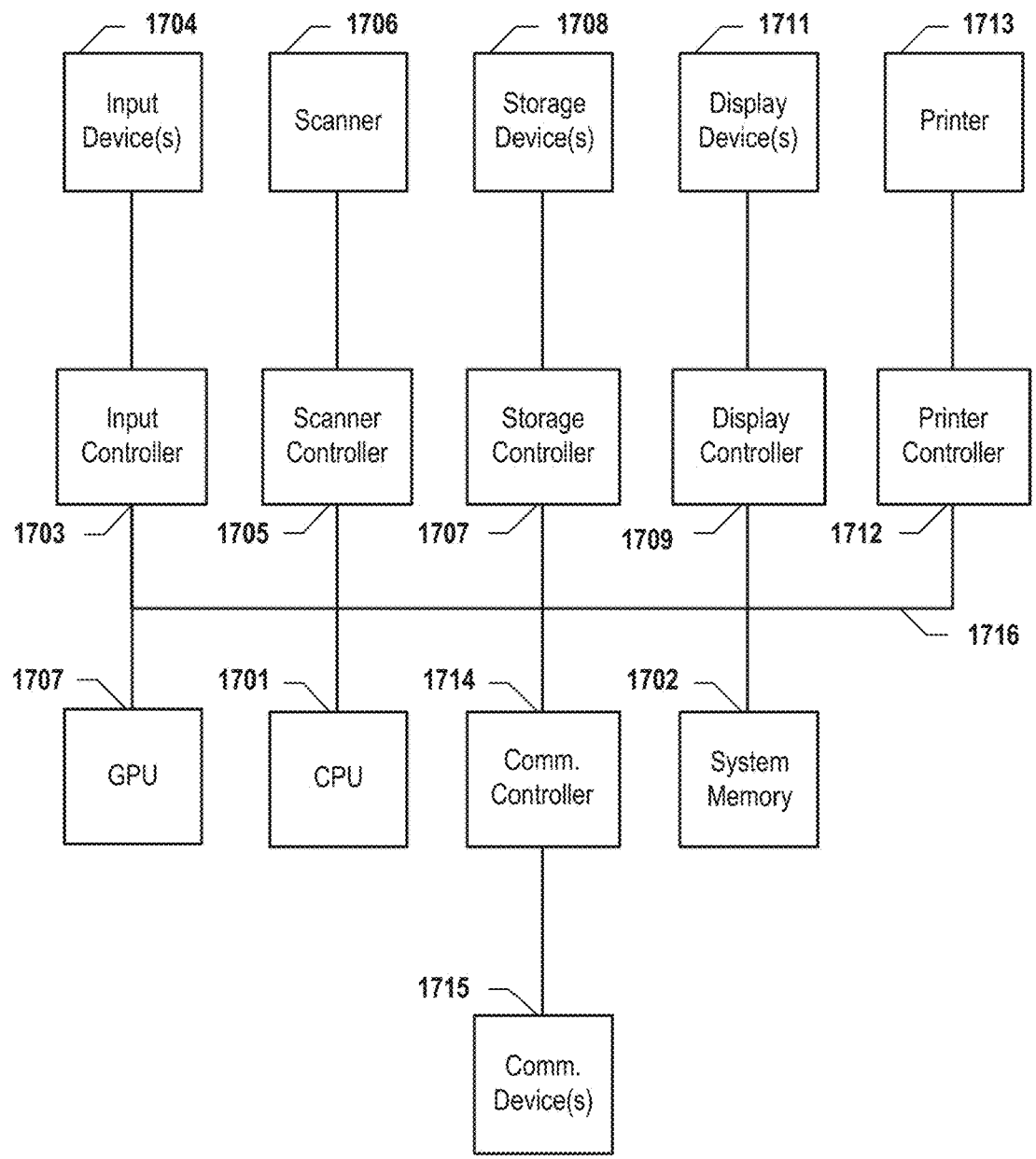
FIG. 17 depicts a simplified block diagram of a computing device/information handling system, in accordance with embodiments of the present disclosure.

FIG. 17 depicts a simplified block diagram of a computing device/information handling system (or computing system) according to embodiments of the present disclosure. It will be understood that the functionalities shown for system 1700 may operate to support various embodiments of an information handling system—although it shall be understood that an information handling system may be differently configured and include different components.

As illustrated in FIG. 17, system 1700 includes one or more central processing units (CPU) 1701 that provides computing resources and controls the computer. CPU 1701 may be implemented with a microprocessor or the like, and may also include one or more graphics processing units (GPU) 1717 and/or a floating-point coprocessor for mathematical computations. System 1700 may also include a system memory 1702, which may be in the form of random-access memory (RAM), read-only memory (ROM), or both.

A number of controllers and peripheral devices may also be provided, as shown in FIG. 17. An input controller 1703 represents an interface to various input device(s) 1704, such as a keyboard, mouse, or stylus. There may also be a scanner controller 1705, which communicates with a scanner 1706. System 1700 may also include a storage controller 1707 for interfacing with one or more storage devices 1708 each of which includes a storage medium such as magnetic tape or disk, or an optical medium that might be used to record programs of instructions for operating systems, utilities, and applications, which may include embodiments of programs that implement various aspects of the present invention. Storage device(s) 1708 may also be used to store processed data or data to be processed in accordance with the invention. System 1700 may also include a display controller 1709 for providing an interface to a display device 1711, which may be a cathode ray tube (CRT), a thin film transistor (TFT) display, or other type of display. The computing system 1700 may also include a printer controller 1712 for communicating with a printer 1713. A communications controller 1714 may interface with one or more communication devices 1715, which enables system 1700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1716, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of the claims may be arranged differently including having multiple dependencies, configurations, and combinations.

What is claimed is:

1. A computer-implemented method of human-like language acquisition for a compositional framework, the method comprising:
   receiving, at a perception module, a vision input;
   receiving, at a language module, a natural language input comprising one or more words related to the vision input;
   transforming the vision input, at the perception module, into a feature map comprising a visual feature map and a spatial feature map;
   obtaining, at the language module, an attention distribution over words in the natural language input;
   obtaining an averaged word embedding based on the attention distribution;
   using a convolution of a masked portion of the averaged word embedding with at least portion of the feature map, at the language module, to generate an attention map; and
   responsive to the natural language input being a question, using a recognition module to output an answer by performing steps comprising:
      obtaining a question intention from the question using an embedding mask;
      obtaining extracted features using at least a portion of the feature map weighted by the attention map;
      generating an embedding mask from the question intention;
      masking the extracted image features with the embedding mask to obtain one or more masked features; and
      classifying the one or more masked features to output the answer in response to the question.

2. The computer-implemented method of claim 1 wherein the natural language input comprises at least a word not pre-parsed or pre-linked to the visual input.

3. The computer-implemented method of claim 1 wherein the visual input is an environmental image.

4. The computer-implemented method of claim 1 wherein the visual feature map is transformed from the visual input through a Convolutional Neural Network (CNN) in the perception module.

5. The computer-implemented method of claim 1 wherein attention of a word in the natural language input for the attention distribution is determined by at least a global sentential context and a local context at each word.

6. The computer-implemented method of claim 1 wherein both the global sentential context and local contexts are computed based on a syntax embedding that is a projection of word embeddings converted from the natural language input.

7. The computer-implemented method of claim 1 further comprising:
in response to the natural language input as a navigation command or request:
convolving the visual feature map with a filter to get an environment map;
stacking the environment map and the attention map, at an action module, to project a state vector using an action Convolutional Neural Network (CNN); and
projecting the state vector to a distribution over a plurality of actions.

8. The computer-implemented method of claim 1 wherein the embedding mask in the step of obtaining a question intention from the question using an embedding mask is obtained by performing steps comprising:
converting the question into a sequence of word embeddings;
projecting the sequence of word embeddings into a sequence of functionality embeddings;
obtaining an averaged functionality embedding based on the sequence of functionality embeddings; and
obtaining the embedding mask using mask computation on the averaged functionality embedding.

9. The computer-implemented method of claim 8 wherein the language module further comprising a bidirectional RNN, which outputs a booting vector to initialize a programmer RNN within the language module for obtaining attention distribution over words.

10. A computer-implemented method for end-to-end training a compositional framework for human-like language acquisition, the method comprising:
converting a natural language input comprising one or more words related to an image into word embeddings by using a word embedding table;
generating a feature map comprising a visual feature map and a spatial feature map from the image using a convolution neural network;
projecting the word embeddings using a first set of one or more layers to form syntax embeddings;
projecting the word embeddings using a second set of one or more layers to form functionality embeddings;
using the syntax embeddings as an input to a neural network to obtain a distribution of attentions over the plurality of words in the natural language input;
obtaining an averaged word embedding based on the distribution of attentions;
using the functionality embeddings and one or more neural networks to obtain a mask;
using the mask to obtain a masked averaged word embedding;
convolving the masked average word embedding with at least a portion of the feature map to obtain a convolved output;
using the convolved output to generate a spatial attention map of the image; and
generating a response to the natural language input based at least on the spatial attention map.

11. The computer-implemented method of claim 10 wherein:
in response to the natural language input is a navigation command, the response is one or more actions.

12. The computer-implemented method of claim 10 wherein:
in response to the natural language input is a recognition question, the response is a most possible word or words corresponding to an extracted feature extracted from the feature map weighted by the spatial attention map.

13. The computer-implemented method of claim 10 wherein the step of using the convolved output to generate a spatial attention map of the image comprises:
inputting the convolved output to a softmax layer to obtain a sum-to-one attention map; and
given a cached attention map from a previous step, generating the spatial attention map by convolving a translation of the sum-to-one attention map with the cached attention map.

14. The computer-implemented method of claim 11 wherein an action from the one or more actions is obtain by performing the steps comprising:
convolving the visual feature map with a filter to get an environment map;
obtaining a state vector by inputting the environment map and the spatial attention map into a Convolutional Neural Network (CNN) and projecting its output;
projecting the state vector to a distribution over a plurality of actions; and
selecting the action using the distribution.

15. A computer-implemented method for training a compositional framework for human-like language acquisition, the method comprising:
receiving a natural language input comprising one or more words related to an image;
converting the natural language input into a sequence of word embeddings;
projecting the sequence of word embeddings into syntax embeddings and functionality embeddings;
feeding the syntax embeddings into a recurrent neural network (RNN) to obtain word context vectors;
computing attention for each word from its word context vector;
obtaining a weighted average attention based on the attention for each word;
using a convolved output obtained by convolving the weighted average attention with a feature map extracted from the image to get a generated attention map, the feature map is formed using a convolutional neural network and comprises a visual feature map and a spatial feature map;
combining the generated attention map with a cached attention map in a previous step, if available, to obtain a current attention map; and
generating a response to the natural language input based at least on the current attention map.

16. The computer-implemented method of claim 15 further comprising caching the current attention map via a forget gate using a weighted combination of the cached attention map and the current attention map.

17. The computer-implemented method of claim 15 wherein the cached attention map in the previous step is convolved with a 180-degree rotation of the generated attention map.

18. The computer-implemented method of claim 15 further comprising:
in response to the natural language input being a navigation command:
inputting the current attention map and an environment map into an action Convolutional Neural Network (CNN) and projecting its output to obtain a state vector, the environment map is obtained by convolving the visual feature map with a filter; and projecting the state vector to a distribution over a plurality of actions in one or more time steps.

19. The computer-implemented method of claim 18 further comprising:

assigning a positive reward number if the navigation command is accomplished correctly before a time threshold; and assigning a negative reward number if the navigation command is not implemented correctly or accomplished above the time threshold.

* * * * *